United States Patent
Matsuoka et al.

(10) Patent No.: US 6,630,973 B1
(45) Date of Patent: Oct. 7, 2003

(54) OPTICALLY ANISOTROPIC CELLULOSE ESTER FILM CONTAINING DISCOTIC COMPOUND

(75) Inventors: Koushin Matsuoka, Minami-ashigara (JP); Ken Kawata, Minami-ashigara (JP); Masahiko Murayama, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/533,369

(22) Filed: Mar. 22, 2000

(30) Foreign Application Priority Data

Mar. 31, 1999 (JP) .............................. 11-091290
Sep. 30, 1999 (JP) .............................. 11-315745

(51) Int. Cl.$^7$ .............................. G02F 1/1335
(52) U.S. Cl. .................. 349/117; 428/1.1; 349/118; 349/96
(58) Field of Search ................ 428/1.1, 1.33, 428/532; 349/117, 118, 96, 120

(56) References Cited

U.S. PATENT DOCUMENTS

| | | | | | |
|---|---|---|---|---|---|
| 5,583,679 | A | * | 12/1996 | Ito et al. | 349/118 |
| 5,747,121 | A | * | 5/1998 | Okazaki et al. | 428/1 |
| 5,805,253 | A | * | 9/1998 | Mori et al. | 349/118 |
| 5,880,800 | A | * | 3/1999 | Miruka et al. | 349/122 |
| 5,948,487 | A | * | 9/1999 | Sahouani et al. | 428/1 |
| 6,064,457 | A | * | 5/2000 | Aminaka | 349/117 |

* cited by examiner

Primary Examiner—Tarifur R. Chowdhury
Assistant Examiner—Thoi V. Duong
(74) Attorney, Agent, or Firm—Burns, Doane, Swecker & Mathis, LLP

(57) ABSTRACT

An optically anisotropic cellulose ester film is disclosed. The film contains a discotic compound in an amount of 0.01 to 20 weight parts based on 100 weight parts of cellulose ester. The film has a $Rth^{550}$ retardation value in the range of 60 to 1,000 nm. The cellulose ester film can be used in an optical compensatory sheet, an ellipsoidal polarizing plate and a liquid crystal display.

15 Claims, 12 Drawing Sheets

OPTICALLY ANISOTROPIC CELLULOSE ESTER FILM CONTAINING DISCOTIC COMPOUND

FIELD OF THE INVENTION

The present invention relates to an optically anisotropic cellulose ester film. The invention also relates to an optical compensatory sheet, an ellipsoidal polarizing plate and a liquid crystal display.

BACKGROUND OF THE INVENTION

A liquid crystal display generally has a liquid crystal cell, a polarizing element and an optical compensatory sheet (phase retarder). In a display of transmission type, two polarizing elements are provided on both sides of the liquid crystal cell, and one or two optical compensatory sheets are placed between the liquid crystal cell and the polarizing element. On the other hand, a display of reflection type comprises a reflection board, a liquid crystal cell, one optical compensatory sheet and one polarizing element in this order.

The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecule. According to alignment of the rod-like liquid crystal molecules in the cell, various display modes are proposed. Examples of the display modes for transmission type include TN (twisted nematic) mode, IPS (in plane switching) mode, FLC (ferroelectric liquid crystal) mode, OCB (optically compensatory bend) mode, STN (super twisted nematic) mode and VA (vertically aligned) mode. Examples of the modes for reflection type include TN mode and HAN (hybrid aligned nematic) mode.

The polarizing element generally comprises two transparent protective films provided on both sides of a polarizing film.

The optical compensatory sheet is widely used in various liquid crystal displays because it prevents the displayed image from undesirable coloring and enlarges a viewing angle. As the optical compensatory sheet, a stretched birefringent film has been used.

In place of the stretched birefringent film, an optical compensatory sheet comprising an optically anisotropic layer on a transparent substrate has been proposed. The optically anisotropic layer is formed by aligning liquid crystal molecules (in particular, discotic liquid crystal molecules) and fixing the aligned molecules. For preparing the optically anisotropic layer, a liquid crystal compound having a polymerizable group is generally used and the alignment of the molecules is fixed by polymerization reaction. The liquid crystal molecules usually have large birefringence, and they also have various alignment forms. Accordingly, an optical compensatory sheet obtained by using the liquid crystal molecules has a specific optical characteristic that cannot be obtained by the conventional stretched birefringent film.

The optical characteristic of the compensatory sheet is determined according to the aforementioned display mode of the liquid crystal cell. If liquid crystal molecules, particularly discotic liquid crystal molecules are used, various compensatory sheets suitable for various display modes can be produced.

Actually, according to various display modes, various optical compensatory sheets comprising discotic liquid crystal molecules have been proposed. The optical compensatory sheet for a TN mode is disclosed in Japanese Patent Provisional Publication No. 6(1994)-214116, U.S. Pat. Nos. 5,583,679, 5,646,703 and German Patent Publication No. 3,911,620A1. Japanese Patent Provisional Publication No. 10(1998)-54982 discloses the compensatory sheet for an IPS or FLC mode. The sheet for an OCB or HAN mode is described in U.S. Pat. No. 5,805,253 and International Patent No. WO96/37804. Japanese Patent Provisional Publication No. 9(1997)-26572 discloses the sheet for a STN mode. The optical compensatory sheet for a VA mode is disclosed in U.S. Pat. No. 2,866,372.

Although liquid crystal molecules can be oriented in various alignments, there is a case that the optical anisotropy of the aligned molecules can not fully compensate the liquid crystal cell by itself. For that case, U.S. Pat. No. 5,646,703 proposes to use an optical anisotropic film as the transparent support to compensate the liquid crystal cell in cooperation with the optical anisotropy of the aligned liquid crystal molecules. As the optical anisotropic support, a stretched film of synthetic polymer has been practically used.

However, a conventional optical anisotropic support of synthetic polymer film does not satisfyingly function as a support. Further, that film is difficult to use for an ellipsoidal polarizing plate in which the optical compensatory sheet and the polarizing element are unified.

SUMMERY OF THE INVENTION

The applicants have tried to use a cellulose ester film where the film should have an optical anisotropy (a high retardation value). As a support, the cellulose ester film is superior to a stretched film of a synthetic polymer. Therefore, if a cellulose ester film has a high optical anisotropy (a high retardation value), the cellulose ester film can be used as an optically anisotropic support of an optical compensatory sheet.

However, a cellulose ester film having a low retardation value has been considered preferable according to prior art. Therefore, a method of increasing the retardation value of the cellulose ester film has been scarcely studied, while a method of decreasing the retardation value has been intensively studied.

The applicants have studied the method of increasing the retardation value of the cellulose ester film, and have succeeded in obtaining a cellulose ester film having a high retardation value.

An object of the present invention is to provide a cellulose ester film having a high retardation value.

Another object of the present invention is to provide an optical compensatory sheet comprising a cellulose ester film having a high retardation value.

A further object of the invention is to provide an ellipsoidal polarizing plate comprising a cellulose ester film having a high retardation value.

A furthermore object of the invention is to provide a liquid crystal display comprising an optically anisotropic transparent support.

The present invention provides a cellulose ester film containing a discotic compound in an amount of 0.01 to 20 weight parts based on 100 weight parts of cellulose ester, wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

The invention also provides an optical compensatory sheet consisting of a cellulose ester film, wherein the film contains a discotic compound in an amount of 0.01 to 20 weight parts based on 100 weight parts of cellulose ester, and wherein the film has a $Rth^{550}$ retardation value in the range of 60 to 1,000 nm.

The invention further provides an optical compensatory sheet comprising a cellulose ester film and an optically anisotropic layer comprising liquid crystal molecules, wherein the film contains a discotic compound in an amount of 0.01 to 20 weight parts based on 100 weight parts of cellulose ester, and wherein the film has a $Rth^{550}$ retardation value in the range of 60 to 1,000 nm.

The invention furthermore provides an ellipsoidal polarizing plate comprising a transparent protective film, a polarizing film, a transparent support and an optically anisotropic layer comprising liquid crystal molecules in this order, wherein the transparent support is a cellulose ester film containing a discotic compound in an amount of 0.01 to 20 weight parts based on 100 weight, parts of cellulose ester, and wherein the film has a $Rth^{550}$ retardation value in the range of 60 to 1,000 nm.

The invention still further provides a liquid crystal display comprising a liquid crystal cell and two polarizing elements arranged on both sides of the liquid crystal cell, wherein at least one of the polarizing elements is an ellipsoidal polarizing plate comprising a transparent protective film, a polarizing film, a transparent support and an optically anisotropic layer containing liquid crystal molecules in this order, wherein the transparent support is a cellulose ester film containing a discotic compound in an amount of 0.01 to 20 weight parts based on 100 weight parts of cellulose ester, and wherein the film has a $Rth^{550}$ retardation value in the range of 60 to 1,000 nm.

The invention still furthermore provides a liquid crystal display comprising a reflection board, a liquid crystal cell and a polarizing element in this order, wherein the polarizing element is an ellipsoidal polarizing plate comprising a transparent protective film, a polarizing film, a transparent support and an optically anisotropic layer containing liquid crystal molecules in this order, wherein the transparent support is a cellulose ester film containing a discotic compound in an amount of 0.01 to 20 weight parts based on 100 weight parts of cellulose ester, and wherein the film has a $Rth^{550}$ retardation value in the range of 60 to 1,000 nm.

The applicants have found that a discotic compound increases the retardation value of the cellulose ester film. If the discotic compound is added in an amount of 0.01 to 20 weight parts based on 100 weight parts of the cellulose ester, the film having a $Rth^{550}$ retardation value of 60 to 1,000 nm is obtained. The film having such a high retardation value can be directly used as an optical compensatory sheet for a liquid crystal display. Further, the film is used as a support for an optical compensatory sheet in which an optically anisotropic layer containing discotic liquid crystal molecules is provided on the support.

Even if a rod-like compound (in which two or more aromatic rings are linearly connected) is used in place of the discotic compound, the cellulose ester film having a high retardation value can be obtained. However, the discotic compound increases the retardation value more than the rod-like compound, and hence a satisfying retardation value can be given by the discotic compound even in a relatively small amount. Further, the discotic compound hardly deposits (bleeds out) on the surface of the film, as compared with the rod-like compound. Accordingly, the cellulose ester film having a high retardation value can be obtained by the discotic compound without bleeding out.

The cellulose ester film having a high retardation value satisfyingly functions as a support, and hence is advantageously used as an optically anisotropic transparent support of an optical compensatory sheet. Further, this cellulose ester film protects the polarizing film well, and hence is advantageously used as optically anisotropic transparent support of an ellipsoidal polarizing plate of unified type.

The ellipsoidal polarizing plate comprising a transparent protective film, a polarizing film, an optically anisotropic transparent support of the cellulose ester film having a high retardation value and an optically anisotropic layer containing liquid crystal molecules is advantageously used for a liquid crystal display of a TN (twisted nematic), VA (vertically aligned), OCB (optically compensatory bend) or HAN (hybrid aligned nematic) mode.

DETAILED DESCRIPTION OF THE INVENTION

[Discotic Compound]

Figure 1:
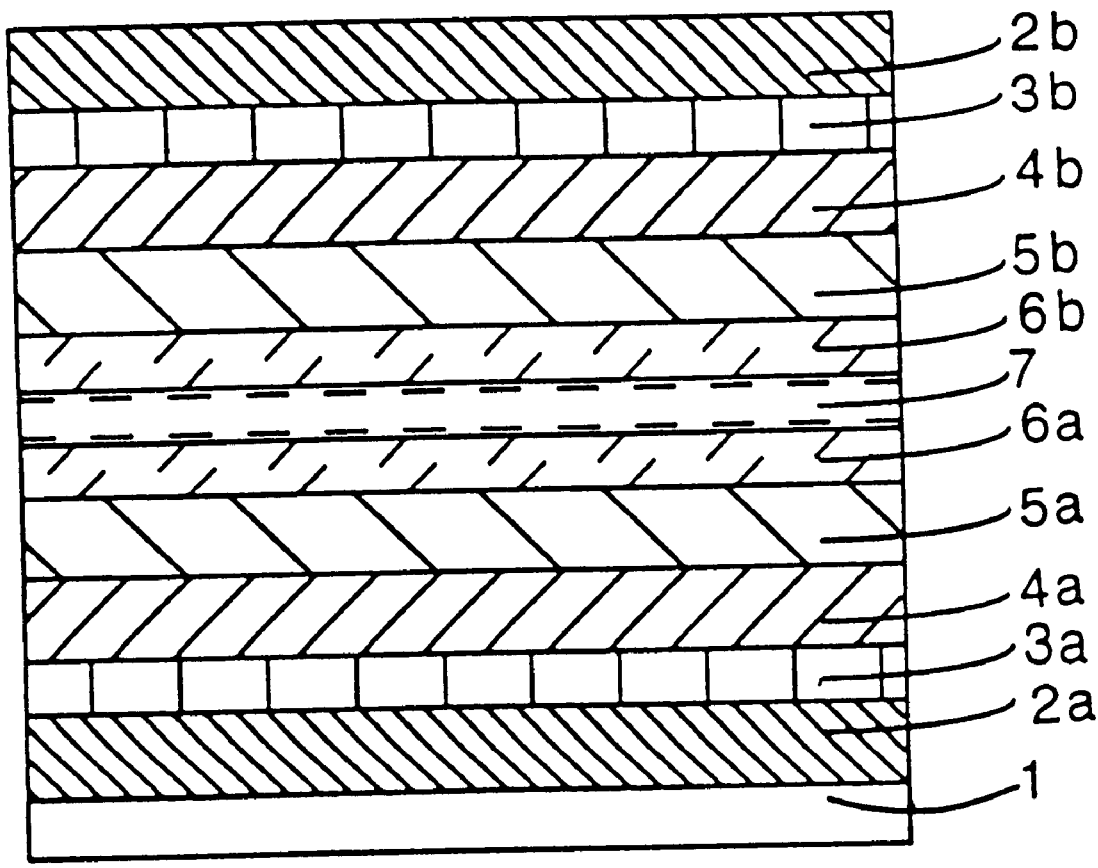
FIG. 1 is a sectional view schematically illustrating a typical liquid crystal display.

In the present invention, a discotic compound is incorporated in a cellulose ester film. The discotic compound can function as a retardation increasing agent for the cellulose ester film.

A molecule of the discotic compound preferably has the proportions described below. If each atom in the discotic core of the molecule is regarded as a sphere with van der Waals radius, a minimum rectangular prism holding all the spheres preferably has the three edges a, b and c satisfying the conditions of $a \geq b > c$ and $b \geq 0.5a$ (preferably $b \geq 0.7a$ and/or $0.5b > c$).

In the present specification, the term "retardation increasing agent for the cellulose ester film" means a compound having a function of increasing the retardation value ($Rth^{550}$ retardation value measured by light of 550 nm along the thickness direction) of a cellulose ester film more than 1.5 time (preferably more than twice, more preferably twice to 10 times) based on a film to which the compound is not added. This increasing ability of the agent is determined when the compound is added in the amount of 3 weight parts based on 100 weight parts of the cellulose ester.

In the invention, the discotic compound is added to a cellulose ester film in an amount of 0.01 to 20 weight parts based on 100 weight parts of the cellulose ester.

The molecules of the discotic compound in the cellulose ester film tend to be so arranged that their disc planes are essentially perpendicular to the film plane. If the disc planes are inclined in the film, their directions can be controlled by stretching the film (as described below).

The discotic compound preferably has a 1,3,5-triazine ring, a porphyrin skeleton or a triphenylene ring, more preferably has a 1,3,5-triazine ring or a porphyrin skeleton, and most preferably has a 1,3,5-triazine ring.

The compound having 1,3,5-triazine ring is preferably represented by the formula (I):

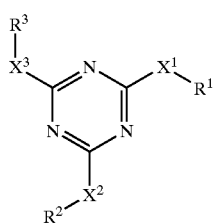

(I)

in which $X^1$ is a single bond, $-NR^4-$, $-O-$ or $-S-$; $X^2$ is a single bond, $-NR^5-$, $-O-$ or $-S-$; $X^3$ is a single bond, $-NR^6-$, $-O-$ or $-S-$; each of $R^1$, $R^2$ and $R^3$ is independently an alkyl group, an alkenyl group, an aryl group or a heterocyclic group; and each of $R^4$, $R^5$ and $R^6$ is independently hydrogen, an alkyl group, an alkenyl group, an aryl group or a heterocyclic group.

The compound represented by the formula (I) is preferably a melamine compound, in which $X^1$, $X^2$ and $X^3$ in the formula (I) are $-NR^4-$, $-NR^5-$ and $-NR^6-$, respectively, or are single bonds provided that each of $R^1$, $R^2$ and $R^3$ is a heterocyclic group having a nitrogen atom with a free radical.

The groups $-X^1-R^1$, $-X^2-R^2$ and $-X^3-R^3$ are preferably identical.

Each of $R^1$, $R^2$ and $R^3$ is preferably an aryl group.

Each of $R^4$, $R^5$ and $R^6$ is preferably hydrogen.

The alkyl group preferably has a chain structure rather than a cyclic structure, and more preferably has a straight chain structure rather than a branched chain structure. The alkyl group preferably has 1 to 30 carbon atoms, more preferably has 1 to 20 carbon atoms, further preferably has 1 to 10 carbon atoms, furthermore preferably has 1 to 8 carbon atoms, and most preferably has 1 to 6 carbon atoms. Further, the alkyl group can have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The alkenyl group preferably has a chain structure rather than a cyclic structure, and more preferably has a straight chain structure rather than a branched chain structure. The alkenyl group preferably has 2 to 30, more preferably has 2 to 20 carbon atoms, further preferably has 2 to 10 carbon atoms, furthermore preferably has 2 to 8 carbon atoms, and most preferably has 2 to 6 carbon atoms. Further, the alkenyl group can have a substituent group. Examples of the substituent groups include a halogen atom, an alkoxy group (e.g., methoxy, ethoxy, epoxyethyloxy) and an acyloxy group (e.g., acryloyloxy, methacryloyloxy).

The aryl group preferably is phenyl or naphthyl, and more preferably is phenyl. The aryl group can have a substituent group. Examples of the substituent groups include a halogen atom, hydroxyl, cyano, nitro, carboxyl, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, sulfamoyl, an alkyl-substituted sulfamoyl group, an alkenyl-substituted sulfamoyl group, an aryl-substituted sulfamoyl group, a sulfonamide group, carbamoyl, an alkyl-substituted carbamoyl group, an alkenyl-substituted carbamoyl group, an aryl-substituted carbamoyl group, an amide group, an alkylthio group, an alkenylthio group, an arylthio group and an acyl group.

The alkyl group is described above. The alkyl moiety of the alkoxy group, the acyloxy group, the alkoxycarbonyl group, the alkyl-substituted sulfamoyl group, the sulfonamide group, the alkyl-substituted carbamoyl group, the amide group, the alkylthio group and the acyl group is the same as the alkyl group described above.

The alkenyl group is described above. The alkenyl moiety of the alkenyloxy group, the acyloxy group, the alkenyloxycarbonyl group, the alkenyl-substituted sulfamoyl group, the sulfonamide group, the alkenyl-substituted carbamoyl group, the amide group, the alkenylthio group and the acyl group is the same as the alkenyl group described above.

Examples of the aryl group include phenyl, α-naphthyl, β-naphthyl, 4-methoxyphenyl, 3,4-diethoxyphenyl, 4-octyloxyphenyl and 4-dodecyoxyphenyl. The aryl moiety of the aryloxy group, the acyloxy group, the aryloxycarbonyl group, the aryl-substituted sulfamoyl group, the sulfonamide group, the aryl-substituted carbamoyl group, the amide group, the arylthio group and the acyl group is the same as the aryl group.

In the case that $X^1$, $X^2$ or $X^3$ is $-NR-$, $-O-$ or $-S-$, the heterocyclic ring is preferably aromatic. The aromatic heterocyclic ring is generally unsaturated, and preferably has double bonds as many as possible. The heterocyclic ring preferably is five-membered, six-membered or seven-membered ring, more preferably is five-membered or six-membered ring, and most preferably is six-membered ring. The hetero-atom in the ring preferably is N, S or O, and more preferably is N. A particularly preferred aromatic heterocyclic ring is a pyridine ring (2-pyridyl or 4-pyridyl). The heterocyclic ring can have a substituent group. Examples of the substituent groups are the same as the substituent groups of the aryl group described above.

In the case that $X^1$, $X^2$ or $X^3$ is a single bond, the heterocyclic ring preferably has a nitrogen atom with a free radical. The heterocyclic ring preferably is five-membered, six-membered or seven-membered ring, more preferably is five-membered or six-membered ring, and most preferably is five-membered ring. The heterocyclic ring can have two or more nitrogen atoms. The heterocyclic ring may have a hetero-atom (e.g., O, S) other than nitrogen, and can have a substituent group. Examples of the substituent groups are the same as the substituent groups of the aryl group described above. Examples of the heterocyclic rings having a nitrogen atom with a free radical are shown below.

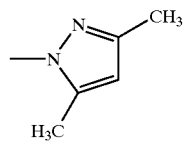
(Hc-1)

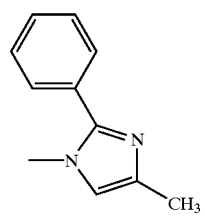
(Hc-2)

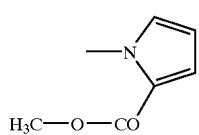
(Hc-3)

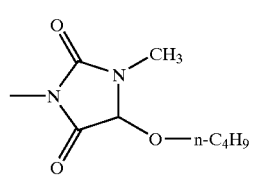
(Hc-4)

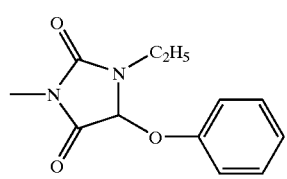
(Hc-5)

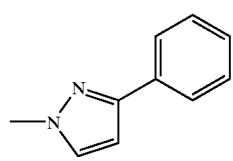
(Hc-6)

-continued

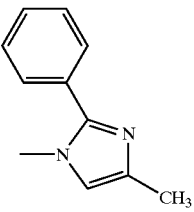
(Hc-7)

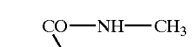
(Hc-8)

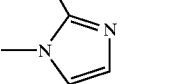
(Hc-9)

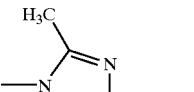
(Hc-10)

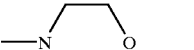
(Hc-11)

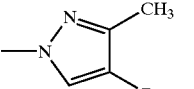
(Hc-12)

The compound having 1,3,5-triazine ring preferably has a molecular weight of 300 to 2,000 and a boiling point of not lower than 260° C. The boiling point can be measured with a commercially available machine (e.g., TG/DTA100, Seiko Instruments Inc.).

Examples of the compound having a 1,3,5-triazine ring are shown below. Two or more groups represented by R in the formulas are identical, and the definition of R is given under each of the formulas by referring to the example number.

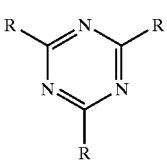
(1)–(12)

(1) butyl
(2) 2-methoxy-2-ethoxyethyl
(3) 5-undecenyl
(4) phenyl
(5) 4-ethoxycarbonylphenyl
(6) 4-butoxyphenyl
(7) p-biphenyl
(8) 4-pyridyl
(9) 2-naphthyl
(10) 2-methylphenyl
(11) 3,4-dimethoxyphenyl
(12) 2-furyl

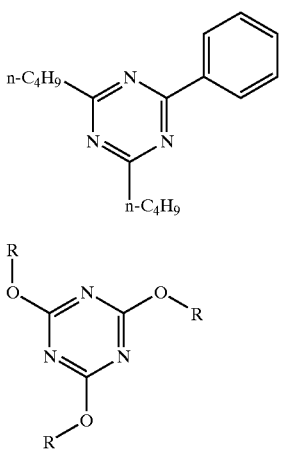
(13)

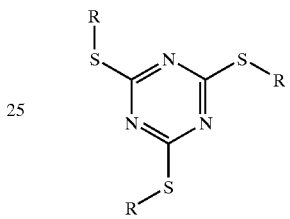
(14)–(79)

(14) phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutylylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl,
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutylylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl (80)–(145)

(80) phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutylylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutylylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl (117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

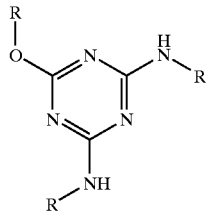

(146)–(164)

(146) phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutylylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

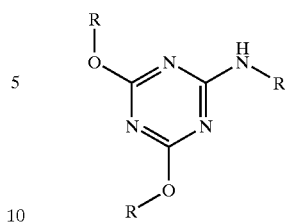

(165)–(183)

(165) phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutylylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

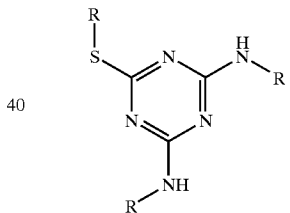

(184)–(202)

(184) phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutylylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

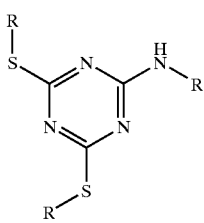

(203) phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenyl
(213) 4-methoxyphenyl
(214) 4-anilinophenyl
(215) 4-isobutylylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

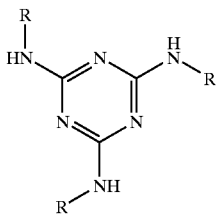

(222) phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutylylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl (203)–(221)

(222)–(419)

(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxyphenyl
(256) 3-phenoxycarbonylphenyl
(257) 3-methoxyphenyl
(258) 3-anilinophenyl
(259) 3-isobutylylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutylylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutylylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutylylaminophenyl
(312) 3,5-diphenoxyphenyl
(313) 3,5-dihydroxyphenyl
(314) 2,4-dibutylphenyl (315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-di-methoxyphenyl
(324) 2,4-di-N-methylaminophenyl
(325) 2,4-diisobutylylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutylylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutylylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutylylaminophenyl
(368) 3,4,5-triphenoxyphenyl
(369) 3,4,5-trihydroxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutylylaminophenyl
(382) 2,4,6-triphenoxyphenyl
(383) 2,4,6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-ethylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2 -naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

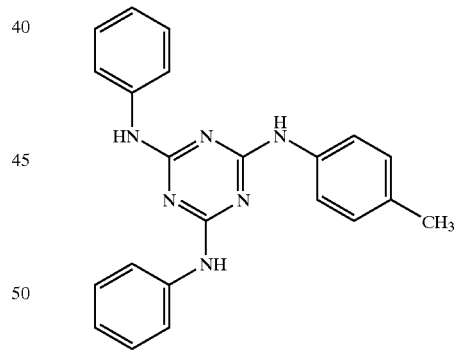

(420)

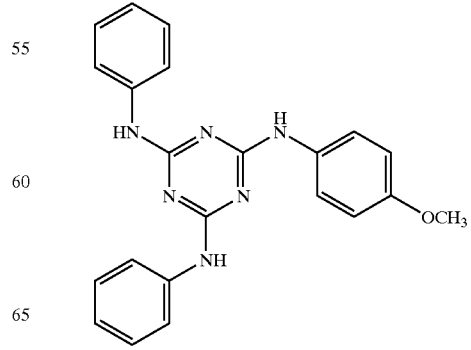

(421)

-continued
(422)
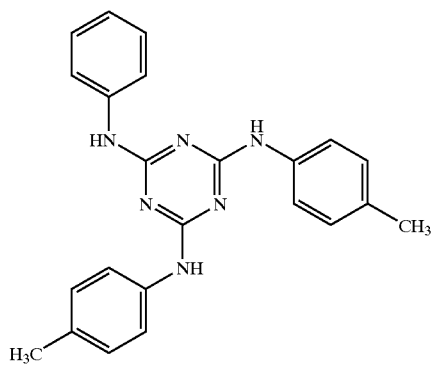
(423)
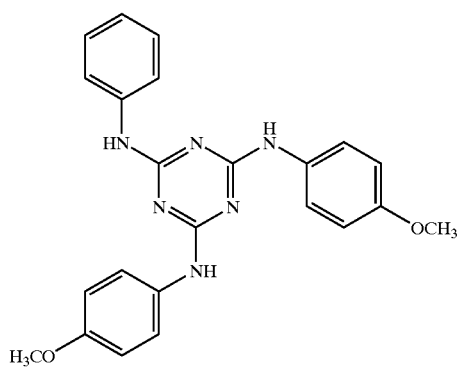
(424)–(426)
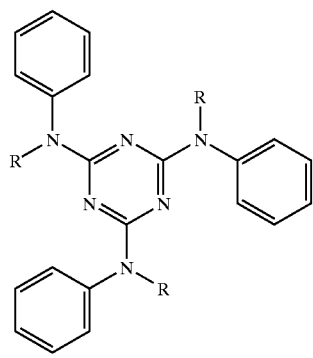
(424) methyl
(425) phenyl
(426) butyl
(427)
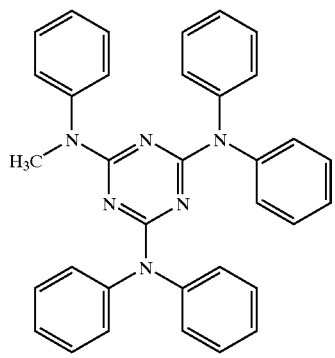
-continued
(428)
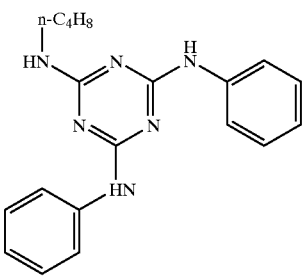
(429)
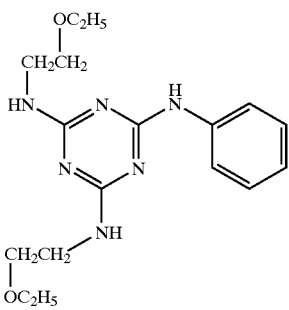
(430)–(437)
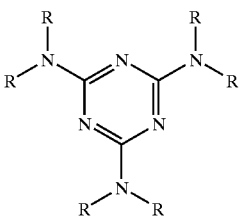
(430) methyl
(431) ethyl
(432) butyl
(433) octyl
(434) dodecyl
(435) 2-butoxy-2-ethoxyethyl
(436) benzyl
(437) 4-methoxybenzyl
(438)
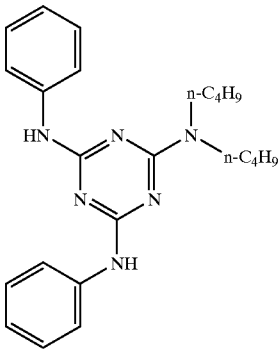

(439)
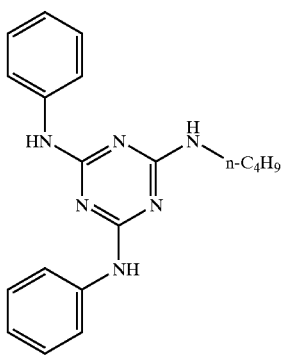
(440)
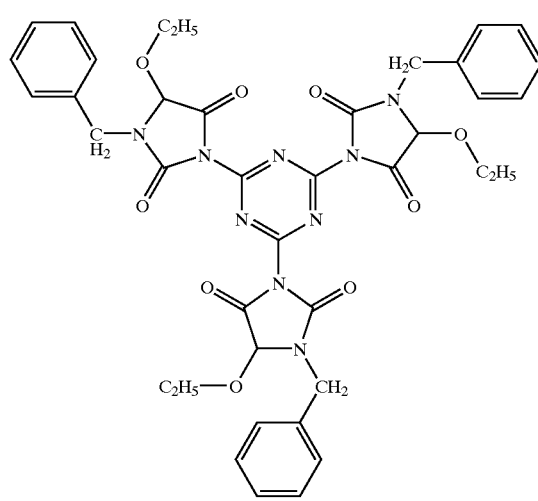
(441)
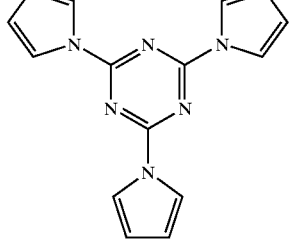
(442)
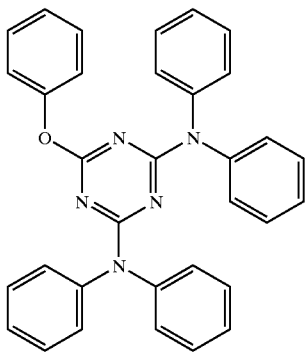
(443)
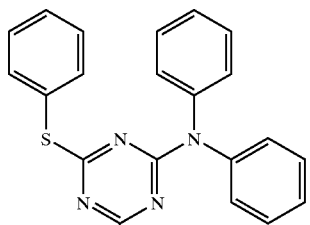
(444)
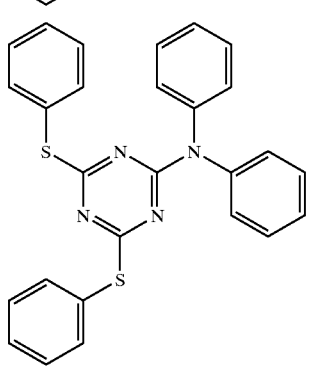
(445)
A melamine polymer can be used as the compound having 1,3,5-triazine ring. The melamine polymer is preferably prepared by the polymerization reaction between a carbonyl compound and a melamine compound. The reaction is represented by the formula (II):
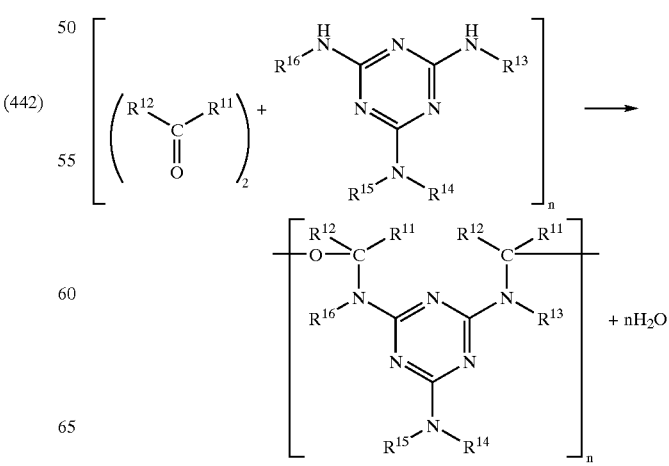

in which each of $R^{11}$, $R^{12}$, $R^{13}$, $R^{14}$, $R^{15}$ and $R^{16}$ is independently hydrogen, an alkyl group, an alkenyl group, an aryl group or a heterocyclic group. The definitions and the substituent groups of the alkyl group, the alkenyl group, the aryl group and the heterocyclic group are the same as those described about the formula (I).

The polymerization reaction between a carbonyl compound and a melamine compound can be carried out in the same manner as the known method for synthesizing a usual melamine resin (e.g., melamine-formaldehyde resin). A commercially available melamine polymer (melamine resin) is also usable.

The melamine polymer preferably has a molecular weight of 2,000 to 400,000.

Examples of the repeating units of the melamine polymers are shown below.

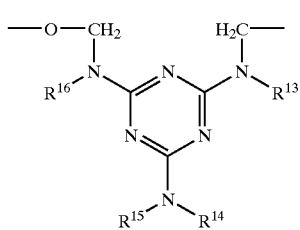

(MP-1)–(MP-50)

(MP-1) $R^{13},R^{14},R^{15},R^{16}:CH_2OH$
(MP-2) $R^{13},R^{14},R^{15},R^{16}:CH_2OCH_3$
(MP-3) $R^{13},R^{14},R^{15},R^{16}:CH_2O\text{-}i\text{-}C_4H_9$
(MP-4) $R^{13},R^{14},R^{15},R^{16}:CH_2O\text{-}n\text{-}C_4H_9$
(MP-5) $R^{13},R^{14},R^{15},R^{16}:CH_2NHCOCH=CH_2$
(MP-7) $R^{13},R^{14},R^{15}:CH_2OH$; $R^{16}:CH_2OCH_3$
(MP-8) $R^{13},R^{14},R^{16}:CH_2OH$; $R^{15}:CH_2OCH_3$
(MP-9) $R^{13},R^{14}:CH_2OH$; $R^{15},R^{16}:CH_2OCH_3$
(MP-10) $R^{13},R^{16}:CH_2OH$; $R^{14},R^{15}:CH_2OCH_3$
(MP-12) $R^{13},R^{14},R^{16}:CH_2OCH_3$; $R^{15}:CH_2OH$
(MP-13) $R^{13},R^{16}:CH_2OCH_3$; $R^{14},R^{15}:CH_2OH$
(MP-14) $R^{13},R^{14},R^{15}:CH_2OH$; $R^{16}:CH_2O\text{-}i\text{-}C_4H_9$
(MP-15) $R^{13},R^{14},R^{16}:CH_2OH$; $R^{15}:CH_2O\text{-}i\text{-}C_4H_9$
(MP-16) $R^{13},R^{14}:CH_2OH$; $R^{15},R^{16}:CH_2O\text{-}i\text{-}C_4H_9$
(MP-17) $R^{13},R^{16}:CH_2OH$; $R^{14},R^{15}:CH_2O\text{-}i\text{-}C_4H_9$
(MP-18) $R^{13}:CH_2OH$; $R^{14},R^{15},R^{16}:CH_2O\text{-}i\text{-}C_4H_9$
(MP-19) $R^{13},R^{14},R^{16}:CH_2O\text{-}i\text{-}C_4H_9$; $R^{15}:CH_2OH$
(MP-20) $R^{13},R^{16}:CH_2O\text{-}i\text{-}C_4H_9$; $R^{14},R^{15}:CH_2OH$
(MP-21) $R^{13},R^{14},R^{15}:CH_2OH$; $R^{16}:CH_2O\text{-}n\text{-}C_4H_9$
(MP-22) $R^{13},R^{14},R^{16}:CH_2OH$; $R^{15}:CH_2O\text{-}n\text{-}C_4H_9$
(MP-23) $R^{13},R^{14}:CH_2OH$; $R^{15},R^{16}:CH_2O\text{-}n\text{-}C_4H_9$
(MP-24) $R^{13},R^{16}:CH_2OH$; $R^{14},R^{15}:CH_2O\text{-}n\text{-}C_4H_9$
(MP-25) $R^{13}:CH_2OH$; $R_{14},R^{15},R^{16}:CH_2O\text{-}n\text{-}C_4H_9$
(MP-26) $R^{13},R^{14},R^{16}:CH_2O\text{-}n\text{-}C_4H_9$; $R^{15}:CH_2OH$
(MP-27) $R^{13},R^{16}:CH_2O\text{-}n\text{-}C_4H_9$; $R^{14},R^{15}:CH_2OH$
(MP-28) $R^{13},R^{14}:CH_2OH$; $R^{15}:CH_2OCH_3$; $R^{16}:CH_2O\text{-}n\text{-}C_4H_9$
(MP-29) $R^{13},R^{14}:CH_2OH$; $R^{15}:CH_2O\text{-}n\text{-}C_4H_9$; $R^{16}:CH_2OCH_3$
(MP-30) $R^{13},R^{16}:CH_2OH$; $R^{14}:CH_2OCH_3$; $R^{15}:CH_2O\text{-}n\text{-}C_4H_9$
(MP-31) $R^{13}:CH_2OH$; $R^{14},R^{15}:CH_2OCH_3$; $R^{16}:CH_2O\text{-}n\text{-}C_4H_9$
(MP-32) $R^{13}:CH_2OH$; $R^{14},R^{16}:CH_2OCH_3$; $R^{15}:CH_2O\text{-}n\text{-}C_4H_9$
(MP-33) $R^{13}:CH_2OH$; $R^{14}:CH_2OCH_3$; $R^{15},R^{16}:CH_2O\text{-}n\text{-}C_4H_9$
(MP-34) $R^{13}:CH_2OH$; $R^{14},R^{15}:CH_2O\text{-}n\text{-}C_4H_9$; $R^{16}:CH_2OCH_3$
(MP-35) $R^{13},R^{14}:CH_2OCH_3$; $R^{15}:CH_2OH$; $R^{16}:CH_2O\text{-}n\text{-}C_4H_9$
(MP-36) $R^{13},R^{16}:CH_2OCH_3$; $R^{14}:CH_2OH$; $R^{15}:CH_2O\text{-}n\text{-}C_4H_9$
(MP-37) $R^{13}:CH_2OCH_3$; $R^{14},R^{15}:CH_2OH$; $R^{16}:CH_2O\text{-}n\text{-}C_4H_9$
(MP-38) $R^{13},R^{16}:CH_2O\text{-}n\text{-}C_4H_9$; $R^{14}:CH_2OCH_3$; $R^{15}:CH_2OH$
(MP-39) $R^{13}:CH_2OH$; $R^{14}:CH_2OCH_3$; $R^{15}:CH_2O\text{-}n\text{-}C_4H_9$; $R^{16}:CH_2NHCOCH=CH_2$
(MP-40) $R^{13}:CH_2OH$; $R^{14}:CH_2OCH_3$; $R^{15}:CH_2NHCOCH=CH_2$; $R^{16}:CH_2O\text{-}n\text{-}C_4H_9$
(MP-41) $R^{13}:CH_2OH$; $R^{14}:CH_2O\text{-}n\text{-}C_4H_9$; $R^{15}:CH_2NHCOCH=CH_2$; $R^{16}:CH_2OCH_3$
(MP-42) $R^{13}:CH_2OCH_3$; $R^{14}:CH_2OH$; $R^{15}:CH_2O\text{-}n\text{-}C_4H_9$; $R^{16}:CH_2NHCOCH=CH_2$
(MP-43) $R^{13}:CH_2OCH_3$; $R^{14}:CH_2OH$; $R^{15}:CH_2NHCOCH=CH_2$; $R^{16}:CH_2O\text{-}n\text{-}C_4H_9$
(MP-44) $R^{13}:CH_2O\text{-}n\text{-}C_4H_9$; $R^{14}:CH_2OCH_3$; $R^{15}:CH_2OH$; $R^{16}:CH_2NHCOCH=CH_2$
(MP-45) $R^{13}:CH_2OH$; $R^{14}:CH_2OCH_3$; $R^{15}:CH_2NHCO(CH_2)_7CH=CH(CH_2)_7CH_3$; $R^{16}:CH_2NHCOCH=CH_2$
(MP-46) $R^{13}:CH_2OH$; $R^{14}:CH_2OCH_3$; $R^{15}:CH_2NHCOCH=CH_2$; $R^{16}:CH_2NHCO(CH_2)_7CH=CH(CH_2)_7CH_3$
(MP-47) $R^{13}:CH_2OH$; $R^{14}:CH_2NHCO(CH_2)_7CH=CH(CH_2)_7CH_3$; $R^{15}:CH_2NHCOCH=CH_2$; $R^{16}:CH_2OCH_3$
(MP-48) $R^{13}:CH_2OCH_3$; $R^{14}:CH_2OH$; $R^{15}:CH_2NHCO(CH_2)_7CH=CH(CH_2)_7CH_3$; $R^{16}:CH_2NHCOCH=CH_2$
(MP-49) $R^{13}:CH_2OCH_3$; $R^{14}:CH_2OH$; $R^{15}:CH_2NHCOCH=CH_2$; $R^{16}:CH_2NHCO(CH_2)_7CH=CH(CH_2)_7CH_3$
(MP-50) $R^{13}:CH_2NHCO(CH_2)_7CH=CH(CH_2)_7CH_3$; $R^{14}:CH_2OCH_3$; $R^{15}:CH_2OH$; $R^{16}:CH_2NHCOCH=CH_2$ (MP-51)–(MP-100)

(MP-51) $R^{13},R^{14},R^{15},R^{16}:CH_2OH$
(MP-52) $R^{13},R^{14},R^{15},R^{16}:CH_2OCH_3$
(MP-53) $R^{13},R^{14},R^{15},R^{16}:CH_2O\text{-}i\text{-}C_4H_9$
(MP-54) $R^{13},R^{14},R^{15},R^{16}:CH_2O\text{-}n\text{-}C_4H_9$
(MP-55) $R^{13},R^{14},R^{15},R^{16}:CH_2NHCOCH=CH_2$
(MP-56) $R^{13},R^{14},R^{15},R^{16}:CH_2NHCO(CH_2)_7CH=CH(CH_2)_7CH_3$
(MP-57) $R^{13},R^{14},R^{15}:CH_2OH$; $R^{16}:CH_2OCH_3$
(MP-58) $R^{13},R^{14},R^{16}:CH_2OH$; $R^{15}:CH_2OCH_3$
(MP-59) $R^{13},R^{14}:CH_2OH$; $R^{15},R^{16}:CH_2OCH_3$
(MP-60) $R^{13},R^{16}:CH_2OH$; $R^{14},R^{15}:CH_2OCH_3$
(MP-61) $R^{13}:CH_2OH$; $R^{14},R^{15},R^{16}:CH_2OCH_3$
(MP-62) $R^{13},R^{14},R^{16}:CH_2OCH_3$; $R^{15}:CH_2OH$
(MP-63) $R^{13},R^{16}:CH_2OCH_3$; $R^{14},R^{15}:CH_2OH$
(MP-64) $R^{13},R^{14},R^{15}:CH_2OH$; $R^{16}:CH_2O\text{-}i\text{-}C_4H_9$
(MP-65) $R^{13},R^{14},R^{16}:CH_2OH$; $R^{15}:CH_2O\text{-}i\text{-}C_4H_9$
(MP-66) $R^{13},R^{14}:CH_2OH$; $R^{15},R^{16}:CH_2O\text{-}i\text{-}C_4H_9$
(MP-67) $R^{13},R^{16}:CH_2OH$; $R^{14},R^{15}:CH_2O\text{-}i\text{-}C_4H_9$
(MP-68) $R^{13}:CH_2OH$; $R^{14},R^{15},R^{16}:CH_2O\text{-}i\text{-}C_4H_9$
(MP-69) $R^{13},R^{14},R^{16}:CH_2O\text{-}i\text{-}C_4H_9$; $R^{15}:CH_2OH$
(MP-70) $R^{13},R^{16}:CH_2O\text{-}i\text{-}C_4H_9$; $R^{14},R^{15}:CH_2OH$
(MP-71) $R^{13},R^{14},R^{15}:CH_2OH$; $R^{16}:CH_2O\text{-}n\text{-}C_4H_9$
(MP-72) $R^{13},R^{14},R^{16}:CH_2OH$; $R^{15}:CH_2O\text{-}n\text{-}C_4H_9$ (MP-73) $R^{13}$,$R^{14}$:$CH_2OH$; $R^{15}$,$R^{16}$:$CH_2O$-n-$C_4H_9$
(MP-74) $R^{13}$,$R^{16}$:$CH_2OH$; $R^{14}$,$R^{15}$:$CH_2O$-n-$C_4H_9$
(MP-75) $R^{13}$:$CH_2OH$; $R^{14}$,$R^{15}$,$R^{16}$:$CH_2O$-n-$C_4H_9$
(MP-76) $R^{13}$,$R^{14}$,$R^{16}$:$CH_2O$-n-$C_4H_9$; $R^{15}$:$CH_2OH$
(MP-77) $R^{13}$,$R^{16}$:$CH_2O$-n-$C_4H_9$; $R^{14}$,$R^{15}$:$CH_2OH$
(MP-78) $R^{13}$,$R^{14}$:$CH_2OH$; $R^{15}$:$CH_2OCH_3$; $R^{16}$:$CH_2O$-n-$C_4H_9$
(MP-79) $R^{13}$,$R^{14}$:$CH_2OH$; $R^{15}$:$CH_2O$-n-$C_4H_9$; $R^{16}$:$CH_2OCH_3$
(MP-80) $R^{13}$,$R^{16}$:$CH_2OH$; $R^{14}$:$CH_2OCH_3$; $R^{15}$:$CH_2O$-n-$C_4H_9$
(MP-81) $R^{13}$:$CH_2OH$; $R^{14}$,$R^{15}$:$CH_2OCH_3$; $R^{16}$:$CH_2O$-n-$C_4H_9$
(MP-82) $R^{13}$:$CH_2OH$; $R^{14}$,$R^{16}$:$CH_2OCH_3$; $R^{15}$:$CH_2O$-n-$C_4H_9$
(MP-83) $R^{13}$:$CH_2OH$; $R^{14}$:$CH_2OCH_3$; $R^{15}$,$R^{16}$:$CH_2O$-n-$C_4H_9$
(MP-84) $R^{13}$:$CH_2OH$; $R^{14}$,$R^{15}$:$CH_2O$-n-$C_4H_9$; $R^{16}$:$CH_2OCH_3$
(MP-85) $R^{13}$,$R^{14}$:$CH_2OCH_3$; $R^{15}$:$CH_2OH$; $R^{16}$:$CH_2O$-n-$C_4H_9$
(MP-86) $R^{13}$,$R^{16}$:$CH_2OCH_3$; $R^{14}$:$CH_2OH$; $R^{15}$:$CH_2O$-n-$C_4H_9$
(MP-87) $R^{13}$:$CH_2OCH_3$; $R^{14}$,$R^{15}$:$CH_2OH$; $R^{16}$:$CH_2O$-n-$C_4H_9$
(MP-88) $R^{13}$,$R^{16}$:$CH_2O$-n-$C_4H_9$; $R^{14}$:$CH_2OCH_3$; $R^{15}$:$CH_2OH$
(MP-89) $R^{13}$:$CH_2OH$; $R^{14}$:$CH_2OCH_3$; $R^{15}$:$CH_2O$-n-$C_4H_9$ $R^{16}$:$CH_2NHCOCH=CH_2$
(MP-90) $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
(MP-91) $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
(MP-92) $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
(MP-93) $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
(MP-94) $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
(MP-95) $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
(MP-96) $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
(MP-97) $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
(MP-98) $R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
(MP-99) $R^{13}$:$CH_2OCH_3$; $R^{14}$:$CH_2OH$; $R^{15}$:$CH_2NHCOCH=CH_2$ $R^{16}$:$CH_2NHCO(CH_2)_7CH=CH(CH_2)_7CH_3$
(MP-100) $R^{13}$:$CH_2NHCO(CH_2)_7CH=CH(CH_2)_7CH_3$; $R^{14}$:$CH_2OCH_3$; $R^{15}$: $CH_2OH$; $R^{16}$:$CH_2NHCOCH=CH_2$ (MP-101) $R^{13}$,$R^{14}$,$R^{15}$,$R^{16}$:$CH_2OH$
(MP-102) $R^{13}$,$R^{14}$,$R^{15}$,$R^{16}$:$CH_2OCH_3$
(MP-103) $R^{13}$,$R^{14}$,$R^{15}$,$R^{16}$:$CH_2O$-i-$C_4H_9$
(MP-104) $R^{13}$,$R^{14}$,$R^{15}$,$R^{16}$:$CH_2O$-n-$C_4H_9$
(MP-105) $R^{13}$,$R^{14}$,$R^{15}$,$R^{16}$:$CH_2NHCOCH=CH_2$
(MP-106) $R^{13}$,$R^{14}$,$R^{15}$,$R^{16}$:$CH_2NHCO(CH_2)_7CH=CH(CH_2)_7CH_3$
(MP-107) $R^{13}$,$R^{14}$,$R^{15}$:$CH_2OH$; $R^{16}$:$CH_2OCH_3$
(MP-108) $R^{13}$,$R^{14}$,$R^{16}$:$CH_2OH$; $R^{15}$:$CH_2OCH_3$
(MP-109) $R^{13}$,$R^{14}$:$CH_2OH$; $R^{15}$,$R^{16}$:$CH_2OCH_3$
(MP-110) $R^{13}$,$R^{16}$:$CH_2OH$; $R^{14}$,$R^{15}$:$CH_2OCH_3$
(MP-111) $R^{13}$:$CH_2OH$; $R^{14}$,$R^{15}$,$R^{16}$:$CH_2OCH_3$
(MP-112) $R^{13}$,$R^{14}$,$R^{16}$:$CH_2OCH_3$; $R^{15}$:$CH_2OH$
(MP-113) $R^{13}$,$R^{16}$:$CH_2OCH_3$; $R^{14}$,$R^{15}$:$CH_2OH$
(MP-114) $R^{13}$,$R^{14}$,$R^{15}$:$CH_2OH$; $R^{16}$:$CH_2O$-i-$C_4H_9$
(MP-115) $R^{13}$,$R^{14}$,$R^{16}$:$CH_2OH$; $R^{15}$:$CH_2O$-i-$C_4H_9$
(MP-116) $R^{13}$,$R^{14}$:$CH_2OH$; $R^{15}$,$R^{16}$:$CH_2O$-i-$C_4H_9$
(MP-117) $R^{13}$,$R^{16}$:$CH_2OH$; $R^{14}$,$R^{15}$:$CH_2O$-i-$C_4H_9$
(MP-118) $R^{13}$:$CH_2OH$; $R^{14}$,$R^{15}$,$R^{16}$:$CH_2O$-i-$C_4H_9$
(MP-119) $R^{13}$,$R^{14}$,$R^{16}$:$CH_2O$-i-$C_4H_9$; $R^{15}$:$CH_2OH$
(MP-120) $R^{13}$,$R^{16}$:$CH_2O$-i-$C_4H_9$; $R^{14}$,$R^{15}$:$CH_2OH$
(MP-121) $R^{13}$,$R^{14}$,$R^{15}$:$CH_2OH$; $R^{16}$:$CH_2O$-n-$C_4H_9$
(MP-122) $R^{13}$,$R^{14}$,$R^{16}$:$CH_2OH$; $R^{15}$:$CH_2O$-n-$C_4H_9$
(MP-123) $R^{13}$,$R^{14}$:$CH_2OH$; $R^{15}$,$R^{16}$:$CH_2O$-n-$C_4H_9$
(MP-124) $R^{13}$,$R^{16}$:$CH_2OH$; $R^{14}$,$R^{15}$:$CH_2O$-n-$C_4H_9$
(MP-125) $R^{13}$:$CH_2OH$; $R^{14}$,$R^{15}$,$R^{16}$:$CH_2O$-n-$C_4H_9$
(MP-126) $R^{13}$,$R^{14}$,$R^{16}$:$CH_2O$-n-$C_4H_9$; $R^{15}$:$CH_2OH$
(MP-127) $R^{13}$,$R^{16}$:$CH_2O$-n-$C_4H_9$; $R^{14}$,$R^{15}$:$CH_2OH$
(MP-128) $R^{13}$,$R^{14}$:$CH_2OH$; $R^{15}$:$CH_2OCH_3$; $R^{16}$:$CH_2O$-n-$C_4H_9$
(MP-129) $R^{13}$,$R^{14}$:$CH_2OH$; $R^{15}$:$CH_2O$-n-$C_4H_9$; $R^{16}$:$CH_2OCH_3$
(MP-130) $R^{13}$,$R^{16}$:$CH_2OH$; $R^{14}$:$CH_2OCH_3$; $R^{15}$:$CH_2O$-n-$C_4H_9$
(MP-131) $R^{13}$:$CH_2OH$; $R^{14}$,$R^{15}$:$CH_2OCH_3$; $R^{16}$:$CH_2O$-n-$C_4H_9$
(MP-132) $R^{13}$:$CH_2OH$; $R^{14}$,$R^{16}$:$CH_2OCH_3$; $R^{15}$:$CH_2O$-n-$C_4H_9$
(MP-133) $R^{13}$:$CH_2OH$; $R^{14}$:$CH_2OCH_3$; $R^{15}$,$R^{16}$:$CH_2O$-n-$C_4H_9$
(MP-134) $R^{13}$:$CH_2OH$; $R^{14}$,$R^{15}$:$CH_2O$-n-$C_4H_9$; $R^{16}$:$CH_2OCH_3$
(MP-135) $R^{13}$,$R^{14}$:$CH_2OCH_3$; $R^{15}$:$CH_2OH$; $R^{16}$:$CH_2O$-n-$C_4H_9$
(MP-136) $R^{13}$,$R^{16}$:$CH_2OCH_3$; $R^{14}$:$CH_2OH$; $R^{15}$:$CH_2O$-n-$C_4H_9$
(MP-137) $R^{13}$:$CH_2OCH_3$; $R^{14}$,$R^{15}$:$CH_2OH$; $R^{16}$:$CH_2O$-n-$C_4H_9$
(MP-138) $R^{13}$,$R^{16}$:$CH_2O$-n-$C_4H_9$; $R^{14}$:$CH_2OCH_3$; $R^{15}$:$CH_2OH$
(MP-139) $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
(MP-140) $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
(MP-141) $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
(MP-142) $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
(MP-143) $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-144) $R^{13}$:$CH_2O$-n-$C_4H_9$; $R^{14}$:$CH_2OCH_3$; $R^{15}$:$CH_2H$; $R^{16}$:$CH_2NHCOCH=CH_2$
(MP-145) $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
(MP-146) $R^{13}$:$CH_2OH$; $R^{14}$:$CH_2OCH_3$; $R^{15}$:$CH_2NHCOCH=CH_2$; $R^{16}$:$CH_2NHCO(CH_2)^7CH=CH(CH_2)_7CH_3$ (MP-101)–(MP-150)

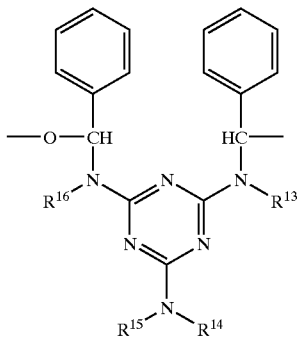

(MP-147) $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
(MP-148) $R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
(MP-149) $R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$
(MP-150) $R^{13}$:$CH_2NHCO(CH_2)_7CH=CH(CH_2)_7CH_3$; $R^{14}$:$CH_2OCH_3$; $R^{15}$:$CH_2OH$; $R^{16}$:$CH_2NHCOCH=CH_2$ (MP-151)–(MP-200)

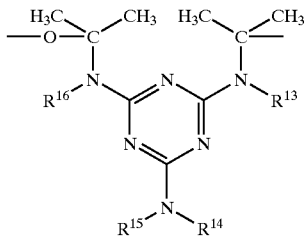

(MP-151) $R^{13},R^{14},R^{15},R^{16}$:$CH_2OH$
(MP-152) $R^{13},R^{14},R^{15},R^{16}$:$CH_2OCH_3$
(MP-153) $R^{13},R^{14},R^{15},R^{16}$:$CH_2O$-i-$C_4H_9$
(MP-154) $R^{13},R^{14},R^{15},R^{16}$:$CH_2O$-n-$C_4H_9$
(MP-155) $R^{13},R^{14},R^{15},R^{16}$:$CH_2NHCOCH=CH_2$
(MP-156) $R^{13},R^{14},R^{15},R^{16}$:$CH_2NHCO(CH_2)_7CH=CH(CH_2)_7CH_3$
(MP-157) $R^{13},R^{14},R^{15}$:$CH_2OH$; $R^{16}$:$CH_2OCH_3$
(MP-158) $R^{13},R^{14},R^{16}$:$CH_2OH$; $R^{15}$:$CH_2OCH_3$
(MP-159) $R^{13},R^{14}$:$CH_2OH$; $R^{15},R^{16}$:$CH_2OCH_3$
(MP-160) $R^{13},R^{16}$:$CH_2OH$; $R^{14},R^{15}$:$CH_2OCH_3$
(MP-161) $R^{13}$:$CH_2OH$; $R^{14},R^{15},R^{16}$:$CH_2OCH_3$
(MP-162) $R^{13},R^{14},R^{16}$:$CH_2OCH_3$; $R^{15}$:$CH_2OH$
(MP-163) $R^{13},R^{16}$:$CH_2OCH_3$; $R^{14},R^{15}$:$CH_2OH$
(MP-164) $R^{13},R^{14},R^{15}$:$CH_2OH$; $R^{16}$:$CH_2O$-i-$C_4H_9$
(MP-165) $R^{13},R^{14},R^{16}$:$CH_2OH$; $R^{15}$:$CH_2O$-i-$C_4H_9$
(MP-166) $R^{13},R^{14}$:$CH_2OH$; $R^{15},R^{16}$:$CH_2O$-i-$C_4H_9$
(MP-167) $R^{13},R^{16}$:$CH_2OH$; $R^{14},R^{15}$:$CH_2O$-i-$C_4H_9$
(MP-168) $R^{13}$:$CH_2OH$; $R^{14},R^{15},R^{16}$:$CH_2O$-i-$C_4H_9$
(MP-169) $R^{13},R^{14},R^{16}$:$CH_2O$-i-$C_4H_9$; $R^{15}$:$CH_2OH$
(MP-170) $R^{13},R^{16}$:$CH_2O$-i-$C_4H_9$; $R^{14},R^{15}$:$CH_2OH$
(MP-171) $R^{13},R^{14},R^{15}$:$CH_2OH$; $R^{16}$:$CH_2O$-n-$C_4H_9$
(MP-172) $R^{13},R^{14},R^{16}$:$CH_2OH$; $R^{15}$:$CH_2O$-n-$C_4H_9$
(MP-173) $R^{13},R^{14}$:$CH_2OH$; $R^{15},R^{16}$:$CH_2O$-n-$C_4H_9$
(MP-174) $R^{13},R^{16}$:$CH_2OH$; $R^{14},R^{15}$:$CH_2O$-n-$C_4H_9$
(MP-175) $R^{13}$:$CH_2OH$; $R^{14},R^{15},R^{16}$:$CH_2O$-n-$C_4H_9$
(MP-176) $R^{13},R^{14},R^{16}$:$CH_2O$-n-$C_4H_9$; $R^{15}$:$CH_2OH$
(MP-177) $R^{13},R^{16}$:$CH_2O$-n-$C_4H_9$; $R^{14},R^{15}$:$CH_2OH$
(MP-178) $R^{13},R^{14}$:$CH_2OH$; $R^{15}$:$CH_2OCH_3$; $R^{16}$:$CH_2O$-n-$C_4H_9$
(MP-179) $R^{13},R^{14}$:$CH_2OH$; $R^{15}$:$CH_2O$-n-$C_4H_9$; $R^{16}$:$CH_2OCH_3$
(MP-180) $R^{13},R^{16}$:$CH_2OH$; $R^{14}$:$CH_2OCH_3$; $R^{15}$:$CH_2O$-n-$C_4H_9$
(MP-181) $R^{13}$:$CH_2OH$; $R^{14},R^{15}$:$CH_2OCH_3$; $R^{16}$:$CH_2O$-n-$C_4H_9$
(MP-182) $R^{13}$:$CH_2OH$; $R^{14},R^{16}$:$CH_2OCH_3$; $R^{15}$:$CH_2O$-n-$C_4H_9$
(MP-183) $R^{13}$:$CH_2OH$; $R^{14}$:$CH_2OCH_3$; $R^{15},R^{16}$:$CH_2O$-n-$C_4H_9$
(MP-184) $R^{13}$:$CH_2OH$; $R^{14},R^{15}$:$CH_2O$-n-$C_4H_9$; $R^{16}$:$CH_2OCH_3$
(MP-185) $R^{13},R^{14}$:$CH_2OCH_3$; $R^{15}$:$CH_2OH$; $R^{16}$:$CH_2O$-n-$C_4H_9$
(MP-186) $R^{13},R^{16}$:$CH_2OCH_3$; $R^{14}$:$CH_2OH$; $R^{15}$:$CH_2O$-n-$C_4H_9$
(MP-187) $R^{13}$:$CH_2OCH_3$; $R^{14},R^{15}$:$CH_2OH$; $R^{16}$:$CH_2O$-n-$C_4H_9$
(MP-188) $R^{13},R_{16}$:$CH_2O$-n-$C_4H_9$; $R^{14}$:$CH_2OCH_3$; $R^{15}$:$CH_2OH$
(MP-189) $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
(MP-190) $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
(MP-191) $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
(MP-192) $R^{13}$:$CH_2OCH_3$; $R^{14}$:$CH_2OH$; $R^{15}$:$CH_2O$-n-$C_4H_9$; $R^{16}R_6$:$CH_2NHCOCH=CH_2$
(MP-193) $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
(MP-194) $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
(MP-195) $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
(MP-196) $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
(MP-197) $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
(MP-198) $R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
(MP-199) $R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$
(MP-200) $R^{13}$:$CH_2NHCO(CH_2)_7CH=CH(CH_2)_7CH_3$; $R^{14}$:$CH_2OCH_3$; $R^{15}$:$CH_2OH$; $R^{16}$:$CH_2NHCOCH=CH_2$

A co-polymer comprising two or more kinds of repeating units is also usable, and two or more homo- or co-polymers can be used in combination.

Two or more compounds having 1,3,5-triazine ring can be used in combination. Further, two or more discotic compounds (for example, a compound having a 1,3,5-triazine ring and a compound having a porphyrin skeleton) can be used in combination.

[Cellulose Ester]

Cellulose ester preferably is a cellulose ester of a lower fatty acid. The lower fatty acid means a fatty acid having 1 to 6 carbon atoms. The number of the carbon atoms preferably is 2 (cellulose acetate), 3 (cellulose propionate) or 4 (cellulose butyrate). Cellulose acetate is particularly preferred. The cellulose ester includes a cellulose ester of two or more fatty acids, such as cellulose acetate propionate or cellulose acetate butyrate.

Cellulose acetate preferably has an average acetic acid content in the range of 55.0% to 62.5%. In view of the physical properties of the support, the acetic acid content is preferably in the range of 58.0% to 62.5%. On the other hand, a film having a high retardation value can be prepared from cellulose acetate having an acetic acid content in the range of 55.0% to 58.0% (preferably 57.0% to 58.0%).

The acetic acid content means the weight ratio of the combined acetic acid based on the amount of the cellulose unit, and it can be measured and calculated according to ASTM, D-817-91 (Testing methods for cellulose acetate etc.).

Cellulose ester preferably has a viscosity average degree of polymerization (DP) in the range of not less than 250, and more preferably not less than 290.

Cellulose ester preferably has a narrow molecular weight distribution in terms of Mw/Mn (wherein Mw means the weight average molecular weight, and Mn means the number average molecular weight). Mw and Mn can be measured by a gel permeation chromatography. The value of Mw/Mn is preferably in the range of 1.0 to 1.7, more preferably in the range of 1.30 to 1.65, and most preferably in the range of 1.40 to 1.60.

[Retardation Values of Film]

A retardation value along the thickness direction of the cellulose ester film is the product of the thickness and the refractive index of birefringence along the thickness direction. The value can be obtained by the following procedure. A ray for measurement is beamed perpendicularly to the film surface, and a retardation in plane is measured based on the slow axis of the film. Independently, the ray is again beamed along an inclined direction to the film surface to measure the retardation in plane. From the measured retardation values in plane, the retardation value along the thickness direction is extrapolated. The measurement can be conducted by means of an ellipsometer (for example, M-150, Japan Spectrum Co., Ltd.).

The retardation value along the thickness direction (Rth) and that in plane (Re) are calculated from the following formulas (1) and (2), respectively:

$$Rth=[\{(nx+ny)/2\}-nz] \times d \quad (1)$$

$$Re=(nx-ny) \times d \quad (2)$$

in which nx and ny are the refractive indexes along x- and y-directions in plane, respectively; nz is the principal refractive index along the thickness direction; and d is the thickness (nm).

In the present invention, a retardation value measured at 550 nm along the thickness direction ($Rth^{550}$) is set in the range of 60 to 1,000 nm, preferably 60 to 400 nm, more preferably 70 to 400 nm, further preferably 70 to 300 nm, and most preferably 70 to 250 nm.

The birefringence along the thickness direction $[\{(nx+ny)/2\}-nz]$ is preferably in the range of $6\times10^{-4}$ to $1\times10^{-2}$, more preferably in the range of $6\times10^{-4}$ to $4\times10^{-3}$, further preferably in the range of $7\times10^{-4}$ to $4\times10^{-3}$, furthermore preferably in the range of $7\times10^{-4}$ to $3\times10^{-3}$, and most preferably in the range of $7\times10^{-4}$ to $2.5\times10^{-3}$.

The film is preferably optically negative uniaxial, and the optic axis preferably is essentially parallel to a normal line of the film plane.

[Organic Solvent]

The cellulose ester film is preferably prepared according to a solvent casting method. The solvent casting method comprises dissolving cellulose ester in an organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) can be also used as the organic solvent. The organic solvent can have another functional group such as alcoholic hydroxyl. In the case that the organic solvent has two or more of the functional groups —O—, —CO— and —COO—, the number of the carbon atoms is defined as a compound having one optionally selected from these groups.

Examples of the ethers having 3 to 12 carbon atoms include diisopropyl ether, dimethoxymethane, 1,4-dioxane, 1,3-dioxolane, tetrahydrofuran, anisole and phenetol.

Examples of the ketones having 3 to 12 carbon atom include acetone, methyl ethyl ketone, diethyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the compounds having two or more kinds of functional groups include 2-ethoxyethyl acetate, 2-methoxyethanol and 2-butoxyethanol.

The halogenated hydrocarbon preferably has one or two carbon atoms, more preferably one carbon atom. The halogen atom of the halogenated hydrocarbon is preferably chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

The most preferred organic solvent is a mixture of three or more solvents. The first solvent of the mixture is selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms. The second solvent is a linear monohydric alcohol having 1 to 5 carbon atoms, and the third solvent is selected from the group consisting of an alcohol having a boiling point in the range of 30 to 170° C. and a hydrocarbon having a boiling point in the range of 30 to 170° C.

The first solvent (ether, ketone, ester or halogenated hydrocarbon) is described above.

The alcohol for the second solvent has an alcoholic hydroxyl attached to the end carbon atom of the linear hydrocarbon chain (primary alcohol) or to the intermediate carbon atom of the chain (secondary alcohol). The second solvent is selected from the group consisting of methanol, ethanol, 1-propanol, 2-propanol, 1-butanol, 2-butanol, 1-pentanol, 2-pentanol and 3-pentanol. The second solvent preferably has 1 to 4 carbon atoms, more preferably has 1 to 3 carbon atoms, and most preferably has 1 or 2 carbon atoms. Ethanol is particularly preferred.

The third solvent is selected from the group consisting of an alcohol having a boiling point in the range of 30 to 170° C. and a hydrocarbon having a boiling point in the range of 30 to 170° C.

The alcohol of the third solvent preferably is monohydric. The hydrocarbon chain of the alcohol can have a linear, branched or cyclic structure. The hydrocarbon chain of the alcohol preferably is a saturated aliphatic hydrocarbon. Hydroxyl of the alcohol can be primary, secondary or tertiary.

Examples of the alcohols for the third solvent include methanol (boiling point: 64.65° C.), ethanol (78.325° C.), 1-propanol (97.15° C.), 2-propanol (82.4° C.), 1-butanol (117.9° C.), 2-butanol (99.5° C.), t-butanol (82.45° C.), 1-petanol (137.5° C.), 2-methyl-2-butanol (101.9° C.) and cyclohexanol (161° C.).

Though the alcohols of the third solvent overlap with those of the second solvent, an alcohol other than used for the second solvent can be used as the third solvent. For example, where ethanol is used as the second solvent, the other alcohols (methanol, 1-propanol, 2-propanol, 1-butanol, 2-butanol, 1-pentanol, 2-pentanol and 3-pentanol) defined in the second solvent can be used as the third solvent.

The hydrocarbon of the third solvent can have a linear, branched or cyclic structure. The hydrocarbon can be aromatic or aliphatic. The aliphatic hydrocarbon can be saturated or not saturated.

Examples of the hydrocarbons for the third solvent include cyclohexane (boiling point: 80.7° C.), hexane (69° C.), benzene (80.1° C.), toluene (110.6° C.) and xylene (138.4 to 144.4° C.).

The mixed organic solvent contains the first solvent preferably in the range of 50 to 95 wt. %, more preferably in the range of 60 to 92 wt. %, further preferably in the range of 65 to 90 wt. %, and most preferably in the range of 70 to 88 wt. %. The second solvent is preferably in the range of 1 to 30 wt. %, more preferably in the range of 2 to 27 wt. %, further preferably in the range of 3 to 24 wt. %, and most preferably in the range of 4 to 22 wt. %. The third solvent is contained preferably in the range of 1 to 30 wt. %, more preferably in the range of 2 to 27 wt. %, further preferably in the range of 3 to 24 wt. %, and most preferably in the range of 4 to 22 wt. %.

Four or more organic solvents can be used in combination. The fourth solvent can be selected from the above-mentioned three (first, second and third) solvents. Further, an ether having 3 to 12 carbon atoms (e.g., diisopropyl ether, dimethoxyethane, diethoxyethane, 1,4-dioxane, 1,3-dioxolan, tetrahydrofuran, anisole, phenetole) and nitromethane can also be used as the fourth solvent.

[Preparation of Solution (Conventional Method)]

A cellulose ester solution can be prepared according to a conventional method. The conventional method means that the solution is prepared at a temperature of not lower than 0° C. (ordinary or elevated temperature). The preparation of the solution can be conducted by using a process and apparatus for preparation of a dope in a conventional solvent casting method. The conventional method preferably uses a halogenated hydrocarbon (particularly methylene chloride) as an organic solvent.

The amount of cellulose ester is so adjusted that a prepared solution contains cellulose ester in an amount of 10 to 40 wt. %. The amount of cellulose ester is more preferably 10 to 30 wt. %. An optional additive (described below) can be added to an organic solvent.

The solution can be prepared by stirring cellulose ester and an organic solvent at an ordinary temperature (0 to 40° C.). A solution of a high concentration is preferably prepared by stirring them at an elevated temperature and at a high pressure. In that case, cellulose ester and the organic solvent are placed in a closed vessel, and are stirred at an elevated temperature and at a high pressure. The temperature is set to be higher than the boiling point at atmospheric pressure but lower than the boiling point of the solvent at the high pressure. Concretely, the heating temperature is usually not lower than 40° C., preferably in the range of 60 to 200° C., and more preferably in the range of 80 to 110° C.

The components can be preliminary dispersed coarsely, and the coarse dispersion can be placed in the vessel. Otherwise, the components can also be introduced into the vessel in series. The vessel should be equipped with a stirring device. A pressure in the vessel can be formed by introducing an inert gas such as nitrogen gas into the vessel, or by heating and evaporating the solvent to increase the vapor pressure. Further, the components can be added to the vessel at a high pressure after the vessel is sealed.

The vessel is preferably heated from the outside. For example, the vessel can be heated by a jacket type heating apparatus. Further, a plate heater can be placed on the bottom of the vessel. Furthermore, a heated liquid can be circulated in a tube around the vessel.

The components are stirred preferably by a stirring wing placed in the vessel. The stirring wing has such a length that the end of the wing reaches near the wall of the vessel. A scratching wing is preferably attached to the end of the stirring wing to scratch the solution remaining on the wall of the vessel.

The vessel can have a meter such as a manometer or a thermometer. The components are dissolved in the solvent in the vessel. The prepared dope is cooled in the vessel, or the dope is cooled after it is taken out of the vessel. The dope can be cooled by a heat exchanger.

[Preparation of Solution (Cooling Dissolution Method)]

The solution can be also prepared according to a cooling dissolution method. According to the cooling dissolution method, cellulose ester can be dissolved even in organic solvents (other than a halogenated hydrocarbon) in which cellulose ester cannot be dissolved according to a conventional method. Further, if organic solvents (such as a halogenated hydrocarbon) in which cellulose ester can be dissolved even by a conventional method are used, the cooling dissolution method can prepare a solution more quickly.

At the first stage of the cooling dissolution method, cellulose ester is gradually added to an organic solvent while stirring at room temperature.

The amount of cellulose ester is in the range of 10 to 40 wt. % based on the amount of the mixture, and is preferably in the range of 10 to 30 wt. %. An optional additive (described below) may be added to the solvent.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). At the cooling stage, the mixture of cellulose ester and the solvent generally solidify.

The cooling rate is preferably faster than 4° C. per minute, more preferably faster than 8° C. per minute, and most preferably faster than 12° C. per minute. The cooling rate is preferably as fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

The solidified mixture is warmed to a temperature of 0 to 200° C., preferably 0 to 150° C., more preferably 0 to 120° C., and most preferably 0 to 50° C. to dissolve the cellulose ester in the solvent. The mixture can be warmed by leaving it at room temperature or on a hot bath.

The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If cellulose ester is not sufficiently dissolved, the cooling and warming steps can be repeated. The dope is observed with eyes to determine whether cellulose ester is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and conducting the warming step at a low pressure. A pressure vessel is preferably used at a high or low pressure.

In the case that cellulose acetate (acetic acid content: 60.9%, viscosity average degree of polymerization: 299) is dissolved in methyl acetate by a cooling dissolution method to form 20 wt. % solution, the solution has a pseudo sol-gel phase transition point at about 33° C., which is measured by a viscoelastic rheology analysis (for example, with Oscillation procedure-of TA Instruments CSL2 Rheometer). Under the transition point, the solution forms a uniform gel. Therefore, the solution should be stored at a temperature higher than the transition point, preferably at a temperature about 10° C. higher than the point. The pseudo sol-gel phase transition point depends on the combined average acetic acid content of cellulose acetate, the viscosity average degree of polymerization, the concentration of the dope and the nature of the solvent.

[Preparation of Film]

The obtained cellulose ester solution (dope) is cast on a support, and the solvent is evaporated to form a cellulose ester film. A drum or a band is used as the support.

Before casting the dope, the concentration of the dope is so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast. After casting the dope, the dope is preferably dried with flowing air for at least 2 seconds. The formed film is peeled off the drum or band, and can be further dried with hot air to remove the solvent remaining in the film. The temperature of the air can be gradually elevated from 100 to 160° C. The above-mentioned method is described in Japanese Patent Publication No. 5(1993)-17844. According to the method, the time for casting and peeling steps can be shortened. The method requires that the dope be set to gel at the surface temperature of the drum or band. The dope formed according to the present invention satisfies the requirement.

The cellulose acetate film has a thickness preferably in the range of 20 to 120 µm, more preferably in the range of 40 to 120 µm, and most preferably in the range of 70 to 100 µm.

[Other Additives]

A plasticizer can be added to the cellulose ester film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the carboxylic esters include phthalic esters and citric esters. Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred.

The amount of the plasticizer is preferably in the range of 0.1 to 25 wt. %, more preferably in the range of 1 to 20 wt. %, and most preferably in the range of 3 to 15 wt. % based on the amount of cellulose ester.

Deterioration inhibitors (e.g., antioxidizing agent, peroxide decomposer, radical inhibitor, metal inactivating agent, oxygen scavenger, amine) or ultraviolet inhibitors can be incorporated into the cellulose acetate film. The deterioration inhibitors are described in Japanese Patent Provisional Publication Nos. 3(1991)-199201, 5(1993) -1907073, 5(1993)-194789, 5(1993)-271471 and 6(1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor can not be expected. If the amount is more than 1 wt. %, the inhibitor often bleeds out on the surface of the film. Butyrated hydroxytoluene (BHT) is a particularly preferred deterioration inhibitor. The ultraviolet inhibitors are described in Japanese Patent Provisional Publication No. 7(1995)-11056.

[Surface Treatment of Film]

In the case that the cellulose ester film is used as a transparent support, the surface of the film can be subjected to surface treatment such as discharge treatment, glow discharge treatment, flame treatment, acid treatment, alkali treatment or UV treatment.

For improving the adhesion between the support and the orientation layer or the optically anisotropic layer, an undercoating layer of gelatin is preferably provided. The undercoating layer preferably has a thickness of 0.01 to 1 µm, more preferably 0.02 to 0.5 µm, most preferably 0.05 to 0.2 µm.

[Structure of Liquid Crystal Display]

The obtained cellulose ester film can be used for various purposes. In particular, the cellulose ester film of the invention is advantageously used as an optical compensatory sheet of a liquid crystal display. Having a high retardation value along the thickness direction, the film itself can be used as an optical compensatory sheet.

The liquid crystal display usually comprises a liquid crystal cell, two polarizing elements arranged on both sides of the liquid crystal cell, and at least one optical compensatory sheet arranged between the liquid crystal cell and at least one of the polarizing elements.

The structure of a representative liquid crystal display is described below referring to FIG. 1.

FIG. 1 is a sectional view schematically illustrating a liquid crystal display.

A liquid crystal layer (7) is arranged between resin substrates (5a, 5b). Transparent electrode layers (6a, 6b) are provided on the liquid crystal side of the resin substrates (5a, 5b). A liquid crystal cell comprises the above-mentioned liquid crystal layer, transparent electrode layers and substrates (5 to 7).

Two optical compensatory sheets (4a, 4b) are attached to both sides of the liquid crystal cell. The cellulose ester film of the invention can be used as the optical compensatory sheets (4a, 4b). The optical compensatory sheets (4a, 4b) have a function of protecting the surface of a polarizing film (3a or 3b) on which the protective film (2a or 2b) is not provided.

Two polarizing elements (2a, 2b, 3a, 3b) are attached to both sides of the optical compensatory sheets (4a, 4b). The polarizing elements comprise protective films (2a, 2b) and polarizing films (3a, 3b).

The liquid crystal display shown in FIG. 1 further comprises a surface treating film (1) on one polarizing element. The surface treating film (1) is provided on the side from which an image is observed. A back light of the liquid crystal display is provided on the reverse side (the side of 2b).

A liquid crystal display may comprise an ellipsoidal polarizing plate having an optical compensatory sheet unified with a polarizing element.

Figure 16:
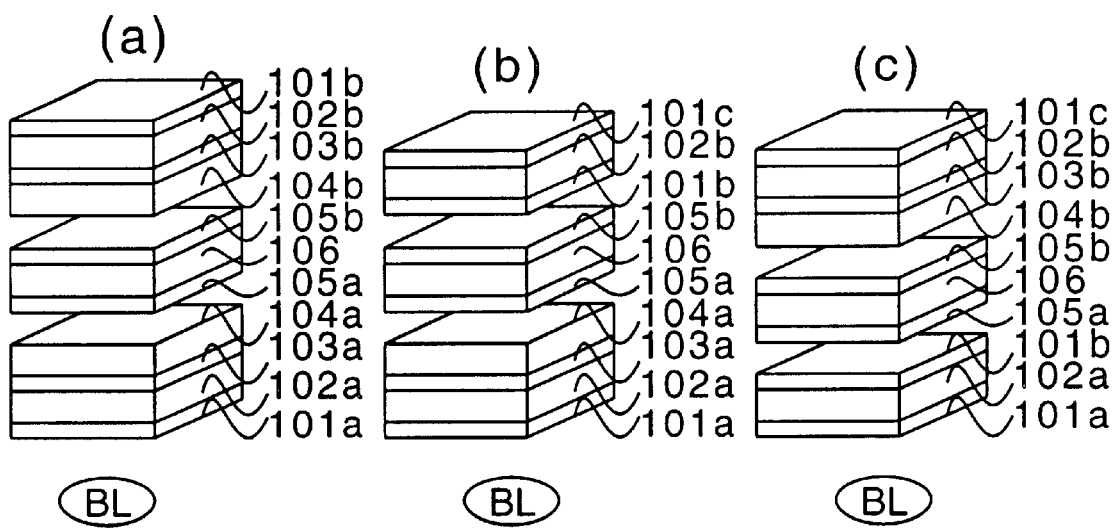
FIG. 16 schematically illustrates basic structures of a liquid crystal display of transmission type equipped with an ellipsoidal polarizing plate.

FIG. 16 schematically illustrates basic structures of the liquid crystal display of transmission type equipped with the ellipsoidal polarizing plate.

The display shown in FIG. 16(a) comprises a transparent protective film (1a), a polarizing film (2a), a transparent support (3a), an optically anisotropic layer (4a), a lower substrate (5a) of the liquid crystal cell, a liquid crystal layer (6) comprising rod-like liquid crystal molecules, an upper substrate (5b) of the liquid crystal cell, a transparent support (3b), a polarizing film (2b) and a transparent protective film (1a) in this order from the back-light (BL) side. The elements of the transparent support (3a) to the optically anisotropic layer (4a) function as an optical compensatory sheet, and those of the optically anisotropic layer (4b) to the support (3b) function as another optical compensatory sheet. Further, the elements of the transparent protective film (1a) to the optically anisotropic layer (4a) function as an ellipsoidal polarizing plate, and those of the optically anisotropic layer (4b) to the transparent protective film (1b) function as another ellipsoidal polarizing plate.

The display shown in FIG. 16(b) comprises a transparent protective film (101a), a polarizing film (102a), a transparent support (103a), an optically anisotropic layer (104a), a lower substrate (105a) of the liquid crystal cell, a liquid crystal layer (106) comprising rod-like liquid crystal molecules, an upper substrate (105b) of the liquid crystal cell, a transparent protective film (101b), a polarizing film (102b) and a transparent protective film (101c) in this order from the back-light (BL) side. The elements of the transparent support (103a) to the optically anisotropic layer (104a) function as an optical compensatory sheet. Further, the elements of the transparent protective film (101a) to the optically anisotropic layer (104a) function as an ellipsoidal polarizing plate.

The display shown in FIG. 16(c) comprises a transparent protective film (101a), a polarizing film (102a), a transparent protective film (101b), a lower substrate (105a) of the liquid crystal cell, a liquid crystal layer (106) comprising rod-like liquid crystal molecules, an upper substrate (105b) of the liquid crystal cell, an optically anisotropic layer (104b), a transparent support (103b), a polarizing film (102b) and a transparent protective film (101c) in this order from the back-light (BL) side. The elements of the optically anisotropic layer (104b) to the transparent support (103b) function as an optical compensatory sheet. Further, the elements of the optically anisotropic layer (104b) to the transparent protective film (101c) function as an ellipsoidal polarizing plate.

Figure 17:
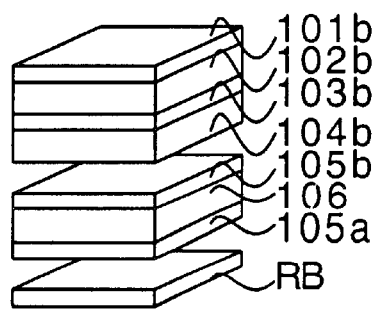
FIG. 17 schematically illustrates a basic structure of a liquid crystal display of reflection type equipped with an ellipsoidal polarizing plate.

FIG. 17 schematically illustrates a basic structure of a liquid crystal display of reflection type equipped with the ellipsoidal polarizing plate.

The display shown in FIG. 17 comprises a lower substrate (105a) of the liquid crystal cell, a liquid crystal layer (106) comprising rod-like liquid crystal molecules, an upper substrate (105b) of the liquid crystal cell, an optically anisotropic layer (104b), a transparent support (103b), a polarizing film (102b) and a transparent protective film (101b) in this order from the reflection board (RB) side. The elements of the optically anisotropic layer (104b) to the transparent support (103b) function as an optical compensatory sheet. Further, the elements of the optically anisotropic layer (104b) to the transparent protective film (101b) function as an ellipsoidal polarizing plate.

With respect to the liquid crystal cell, the optical compensatory sheet and the polarizing element, detailed descriptions are given below.

The liquid crystal layer of the liquid crystal cell is usually prepared by inserting liquid crystal into a space formed by two substrates and a spacer. The transparent electrode layer is prepared by forming a transparent membrane containing an electroconductive substance on the substrate.

A gas barrier layer, a hardcoating layer or an undercoating layer (used as an adhesive layer of the transparent electrode layer) can be provided in the liquid crystal cell. The layers are usually formed on the substrate.

The substrate of the liquid crystal cell has a thickness usually in the range of 80 to 500 $\mu$m.

The optical compensatory sheet is a birefringent film for removing undesired coloring of the displayed image. The cellulose ester film of the invention by itself can be used as the optical compensatory sheet. Further, the film of the invention may be combined with another film having inverse birefringence (in terms of positive/negative), to use as the optical compensatory sheet. The thickness of the optical compensatory sheet is the same as the aforementioned preferred thickness for the film of the invention.

Examples of the polarizing films in the polarizing elements include an iodine polarizing film, a dye polarizing film such as a dichromatic dye polarizing film and a polyene polarizing film. The polarizing film is usually made of a polyvinyl alcohol film.

The protective film of the polarizing element has a thickness preferably in the range of 25 to 350 $\mu$m, and more preferably in the range of 50 to 200 $\mu$m.

A surface treating film can be provided, as is shown in FIG. 1. The surface treating film can function as a hard coating layer, an anti-fogging layer, an antiirradiation layer or an antireflection layer.

Japanese Patent Provisional Publication Nos. 3(1991)-9325, 6(1994)-148429, 8(1996)-50206 and 9(1997)-26572 propose the optical compensatory sheet comprising a support and a thereon-provided optically anisotropic layer containing liquid crystal molecules (particularly, discotic liquid crystal molecules). The cellulose ester film can be used as the support for this optical compensatory sheet.

[Optically Anisotropic Layer]

The optically anisotropic layer contains liquid crystal molecules. As the liquid crystal molecules, rod-like liquid crystal molecules and discotic liquid crystal molecules are preferred, and in particular discotic liquid crystal molecules are preferred.

Preferred examples of the rod-like liquid crystal molecules include azomethines, azoxy compounds, cyanobiphenyls, cyanophenyl esters, bozoic esters, phenyl cyclohexanecarbonate esters, cyanophenylcyclohexanes, cyano-substituted phenylpyrimidines, alkoxy-substituted phenylpyrimidines, phenyldioxanes, tolans and alkenylcyclohexylbenzonitriles. Besides these lower liquid crystal compounds, liquid crystal polymers are also usable. The liquid crystal polymer has a side chain corresponding to the above lower liquid crystal compounds. Japanese Patent Provisional Publication No. 5(1993)-53016 discloses an optical compensatory sheet comprising the liquid crystal polymer.

The discotic liquid crystal molecule is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group preferably is a compound represented by the following formula:

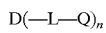

D(—L—Q)$_n$ in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

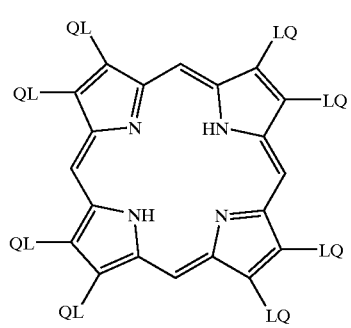
(D1)
(D2)

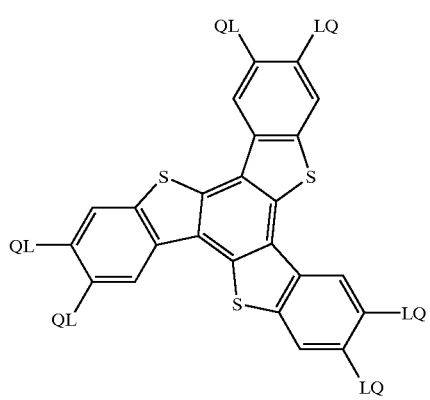
(D3)

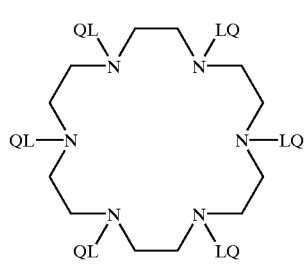

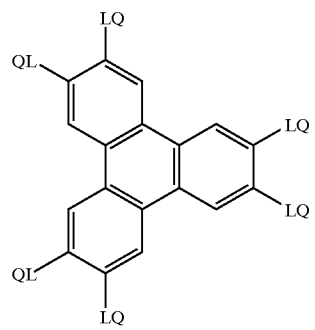
(D4)

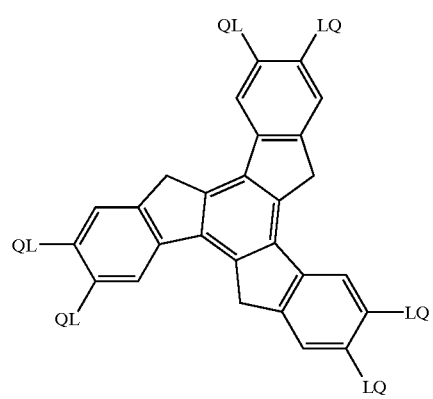
(D5)
(D6)

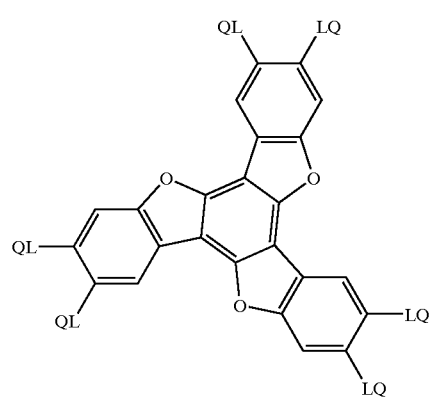
(D7)

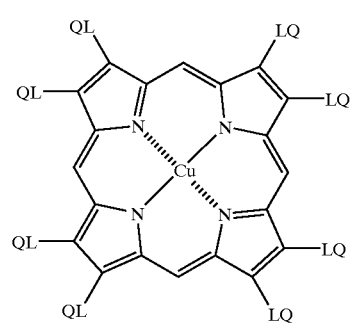

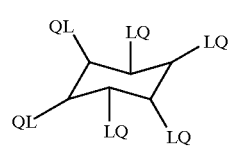
(D8)

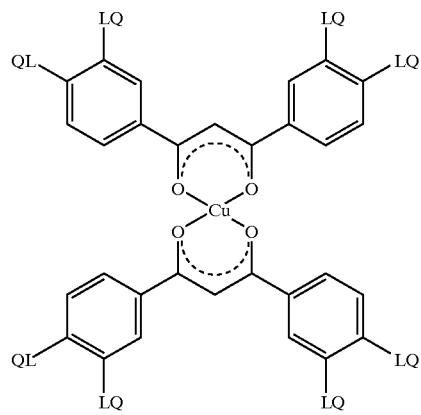
(D9)
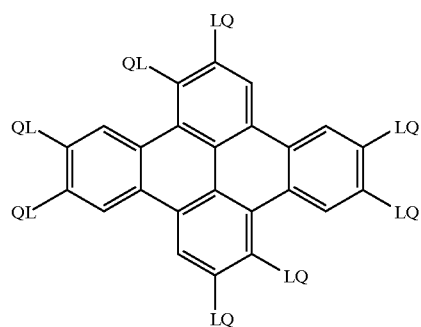
(D10)
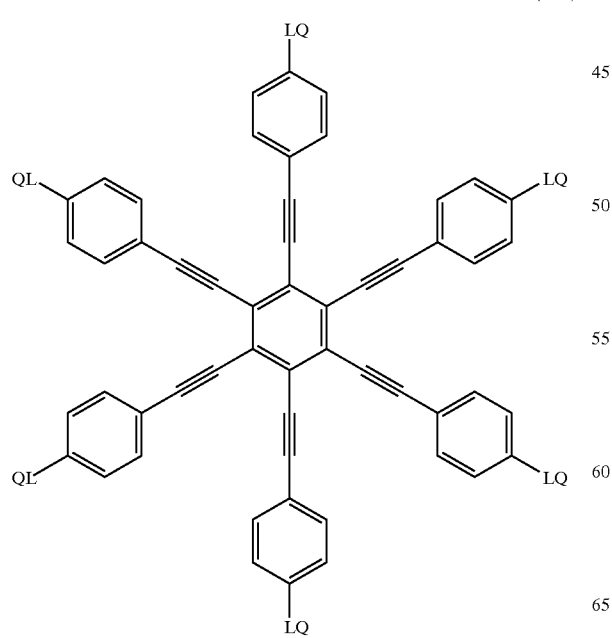
(D11)
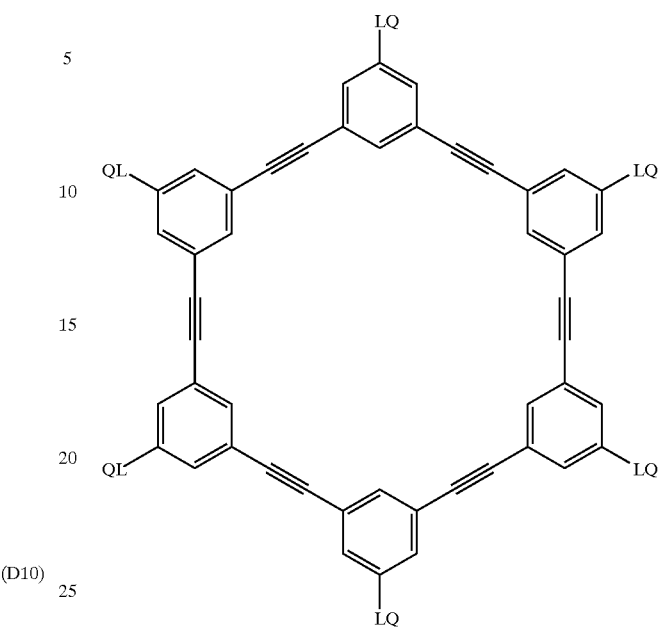
(D12)
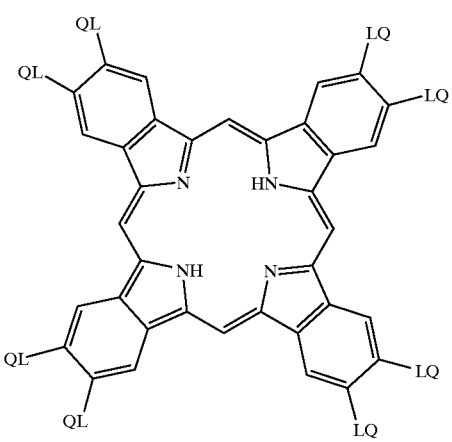
(D13)
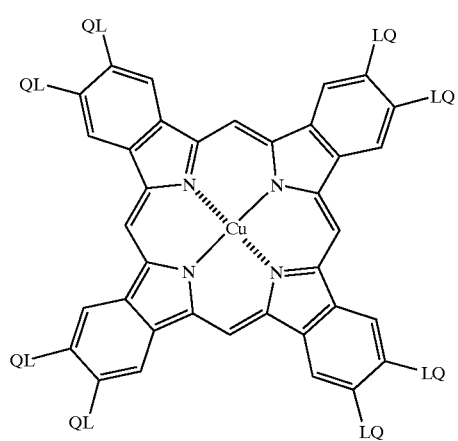
(D14)

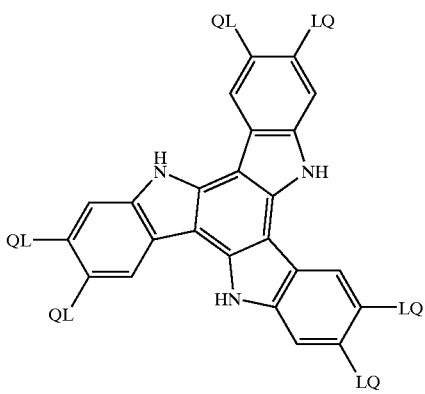
(D15)

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). AL means an alkylene group or an alkenylene group, and AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—AL—O—CO—
L19: —O—CO—AR—O—AL—O—AL—O—AL—O—CO—
L20: —O—CO—AR—O—AL—O—AL—O—AL—O—AL—O—CO—
L21: —S—AL—
L22: —S—AL—O—
L23: —S—AL—O—CO—
L24: —S—AL—S—AL—
L25: —S—AR—Al—

The discotic liquid crystal molecules is oriented in twisted alignment to optically compensate a liquid crystal cell (such as a cell of a STN mode) in which rod-like liquid crystal molecules are oriented in twisted alignment. If the AL (alkylene or alkenylene group) in the above formulas has an asymmetric carbon, the discotic liquid crystal molecules are spirally oriented in twisted alignment. Also by adding a chiral agent (an optical active compound comprising an asymmetric carbon) into the optically anisotropic layer, the discotic liquid crystal molecules are spirally oriented in twisted alignment.

The polymerizable group (Q) is determined according to the polymerization reaction. Examples of the polymerizable groups (Q) are shown below.

—CH=CH₂ (Q1)

—C≡CH (Q2)

—CH₂—C≡CH (Q3)

—NH₂ (Q4)

—SO₃H (Q5)

—CH₂—CH—CH₂ (with epoxide O) (Q6)

—C=CH₂ with CH₃ (Q7)

—CH=CH—CH₃ (Q8)

—N=C=S (Q9)

—SH (Q10)

—CHO (Q11)

—OH (Q12)

—CO₂H (Q13)

—N=C=O (Q14)

—CH=CH—C₂H₅ (Q15)

—CH=CH—n-C₃H₇ (Q16)

—CH=C—CH₃ with CH₃ (Q17)

—CH—CH₂ (with epoxide O) (Q18)

The polymerizable group (Q) preferably is an unsaturated polymerizable group (Q1, Q2, Q3, Q7, Q8, Q15, Q16, Q17) or an epoxy group (Q6, Q18), more preferably is an unsaturated polymerizable group, and most preferably is an ethylenically unsaturated group (Q1, Q7, Q8, Q15, Q16, Q17).

In the formula, n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules having a polymerizable group (Q) can be used in combination with those having no polymerizable group.

The discotic liquid crystal molecule having no polymerizable group preferably has hydrogen atom or an alkyl group in place of the polymerizable group (Q), and is preferably represented by the following formula:

D(—L—R)$_n$ in which D is a discotic core; L is a divalent linking group; R is hydrogen atom or an alkyl group; and n is an integer of 4 to 12.

Examples of the discotic cores (D) in the formula are the same as those of the molecules having polymerizable group except for replacing LQ (or QL) with LR (or RL). Examples of the divalent linking groups (L) are also the same as those shown above.

The alkyl group R preferably comprises 1 to 40, more preferably 1 to 30 carbon atoms, and preferably has a chain structure rather than a cyclic structure. Further, a straight chain structure is preferred to a branched chain. As the alkyl group R, hydrogen atom. or a straight chain alkyl group comprising 1 to 30 carbon atoms is particularly preferred.

An optically anisotropic layer can be formed by coating a solution containing the liquid crystal molecules, a polymerization initiator (described below) and other optional components on an orientation layer.

The solution is preferably prepared by using an organic solvent. Examples of the organic solvents include an amide (e.g., dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g., tetrahydrofuran, 1,2-dimethoxyethane). The alkyl halide and the ketone are preferred. Two or more organic solvents can be used in combination.

The solution can be coated according to a conventional coating method (e.g., extrusion coating method, direct gravure coating method, reverse gravure coating method, die coating method).

The aligned discotic liquid crystal molecule is preferably fixed while keeping the alignment. The discotic liquid crystal molecule is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367, 661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985) -105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 50,000 mJ, and more preferably in the range of 100 to 800 mJ. The light irradiation can be conducted while heating the layer to accelerate the photo polymerization reaction.

The optically anisotropic layer has a thickness preferably in the range of 0.1 to 10 μm, more preferably in the range of 0.5 to 5 μm, and most preferably in the range of 1 to 5 μm.

[Orientation Layer]

The orientation layer can be formed by rubbing treatment of an organic compound (preferably a polymer), oblique evaporation of an inorganic-compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

The polymer for the orientation layer is determined according to the display mode of the liquid crystal cell. If most of the rod-like liquid crystal molecules in the cell are essentially vertically aligned (for example, in the mode of VA, OCB or HAN), the orientation layer should essentially horizontally align the liquid crystal molecules in the optically anisotropic layer. If most of the rod-like liquid crystal molecules in the cell are essentially horizontally aligned (for example, in the mode of STN), the orientation layer should essentially vertically align the liquid crystal molecules in the optically anisotropic layer. Further, if most of the rod-like liquid crystal molecules in the cell are essentially obliquely aligned (for example, in the mode of TN), the orientation layer should essentially obliquely align the liquid crystal molecules in the optically anisotropic layer.

Documents describing optical compensation sheets comprising the discotic liquid crystal molecules for the above various display modes are known, and concrete examples of the polymer for each display mode are disclosed in these documents.

The polymer may be crosslinked to reinforce the orientation layer. For example, a cross-linking group is introduced to the polymer and made to react to cross-link the polymer. The cross-linking reaction of the polymer for the orientation layer is described in Japanese Patent Provisional Publication No. 8(1996)-338913.

The orientation layer preferably has a thickness of 0.01 to 5 μm, more preferably 0.05 to 1 μm.

After the discotic liquid crystal molecules are aligned by the orientation layer and fixed while keeping the alignment to form an optically anisotropic layer, the optically anisotropic layer can be transferred to a support. The aligned and fixed discotic liquid crystal molecules can keep the alignment without the orientation layer. Accordingly, the orientation layer is not essential in the optical compensatory sheet, while the orientation layer is essential in the preparation of the optical compensatory sheet comprising the discotic liquid crystal molecules.

[Liquid Crystal Display of VA Mode]

The cellulose ester film of the invention is advantageously used as a support of the optical compensatory sheet for a liquid crystal display of a vertical alignment (VA) mode.

The liquid crystal display of the VA mode is described below referring to FIGS. 2 to 9.

Figure 2:
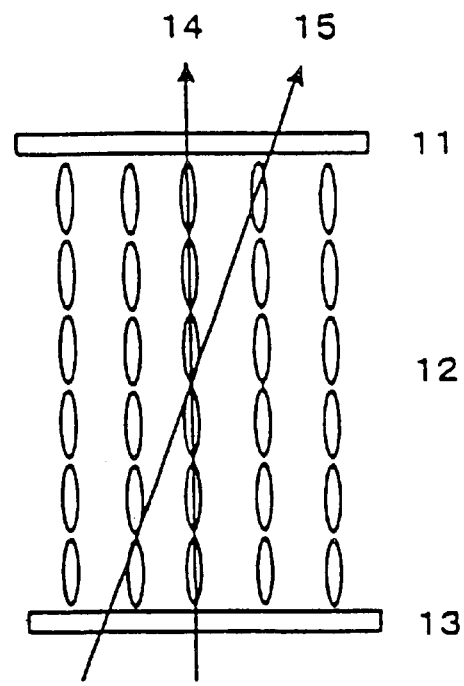
FIG. 2 is a sectional view schematically illustrating alignment of liquid crystal molecules when voltage is not applied to a liquid crystal cell of a VA mode.

FIG. 2 is a sectional view schematically illustrating alignment of liquid crystal molecules when voltage is not applied to a vertically aligned (VA) liquid crystal cell.

As is shown in FIG. 2, a liquid crystal cell comprises an upper substrate (11), a lower substrate (13) and liquid crystal molecules (12) sealed between the substrates. The liquid crystal molecules (12) used in a VA liquid crystal cell generally has a negative dielectric constant anisotropy. When voltage is not applied to a VA liquid crystal cell, the liquid crystal molecules (12) are vertically aligned. Where a pair of polarizing elements (not shown in FIG. 2) are arranged on both sides of the upper and lower substrates (11, 13), no retardation is caused along a normal line (14) of the substrate surface. As a result, light is not transmitted along the normal line (14) to display black.

If the cell is viewed along a direction (15) inclined from the normal line (14), retardation is caused to transmit light. As a result, a contrast of an image is degraded. The retardation along the inclined direction (15) can be compensated with an optical anisotropy of an optical compensatory sheet. The details are described below referring to FIG. 5.

FIG. 2 shows that all the liquid crystal molecules (12) are completely vertically aligned. Practically, however, the aligned molecules are slightly slanted (pretilted) to a direction. The slanted molecules can be aligned to the pretilted direction when voltage is applied to a VA liquid crystal cell (described below referring to FIG. 3).

Figure 3:
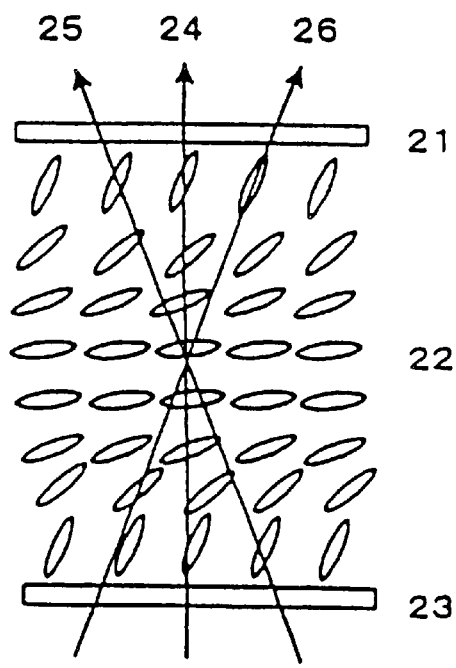
FIG. 3 is a sectional view schematically illustrating alignment of liquid crystal molecules when voltage is applied to a liquid crystal cell of a VA mode.

FIG. 3 is a sectional view schematically illustrating alignment of liquid crystal molecules when voltage is applied to a vertically aligned (VA) liquid crystal cell.

Each of upper and lower substrates (21, 23) has an electrode layer (not shown in FIG. 3) to apply voltage to liquid crystal molecules (22). As is shown in FIG. 3, the liquid crystal molecules placed in the middle of the cell are horizontally aligned by applying voltage to the cell. As a result, retardation is caused along a normal line (24) of the substrate surface to transmit light.

Each of an upper substrate (21) and a lower substrate (23) further has an orientation layer (not shown in FIG. 3) having a function of aligning the liquid crystal molecules (22) vertically. Accordingly, the liquid crystal molecules near the orientation layer are not horizontally aligned, but obliquely aligned along a pretilted direction, though the molecules placed in the middle of the cell are horizontally aligned. If the cell is viewed along a direction (25) inclined from the normal line (24), change of the angle of retardation is relatively small. On the other hand, change of the angle of retardation is relatively large where the cell is viewed along another direction (26). If the pretilted direction (the same as 26) is placed along downward direction in an image, viewing angles along leftward and rightward directions are wide and symmetrical, a viewing angle along a downward direction is wide, but a viewing angle an upward direction is narrow so that the viewing angles along downward and upward directions are asymmetrical. The obliquely (not horizontally) aligned liquid crystal molecules cause the retardation while applying voltage to the cell. This retardation should be compensated to correct the asymmetrical viewing angles (asymmetrical transmittance).

The optical compensatory sheet has a function of compensating the above-mentioned retardation to improve the viewing angle (by correcting the asymmetrical viewing angle while applying voltage to the cell).

Figure 4:
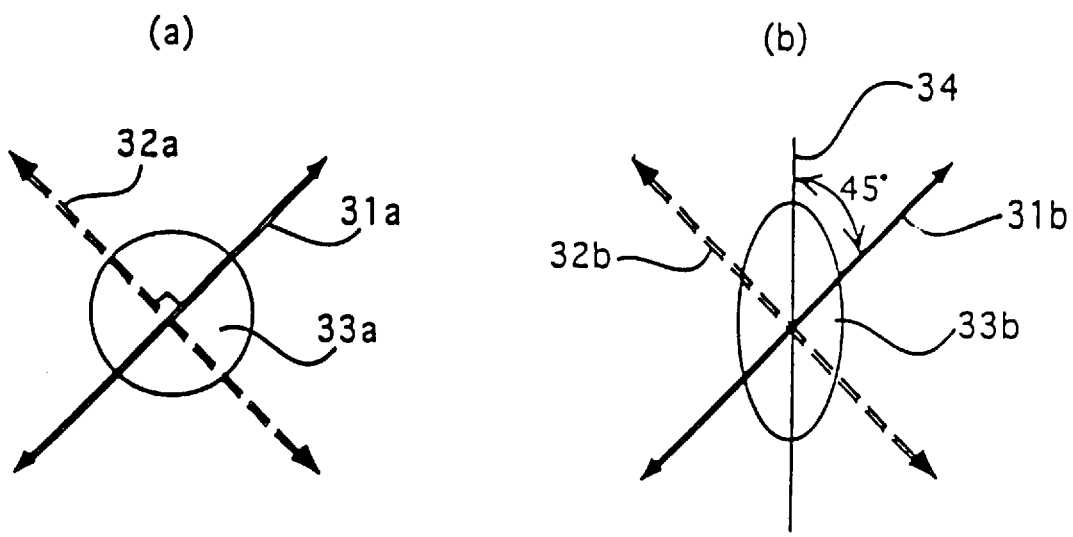
FIG. 4 schematically illustrates a refractive index ellipsoid obtained by viewing, along a normal line of a cell substrate, a liquid crystal cell of a VA mode and a polarizing element of crossed nicols arrangement.

FIG. 4 schematically illustrates a refractive index ellipsoid obtained by viewing a liquid crystal cell of a vertical alignment mode and a polarizing element of crossed nicols arrangement along a normal line of a cell substrate. FIG. 4(a) shows a refractive index ellipsoid when voltage is not applied to the cell, and FIG. 4(b) shows a refractive index ellipsoid when voltage is applied to the cell.

As is shown in FIG. 4, the transmission axis of a polarizing element on the incident side (31a, 31b) is perpendicular to that of another polarizing element on the other side (32a, 32b) in crossed nicols arrangement.

The liquid crystal molecules are vertically aligned (perpendicular to the substrate surface) when voltage is not applied to the cell. A refractive index ellipsoid (33a) has a circular shape shown in FIG. 4(a) when voltage is not applied to the cell. Therefore, the liquid crystal cell having no retardation shown in FIG. 4(a) does not transmit light.

On the other hand, most of the liquid crystal molecules are horizontally aligned (parallel to the substrate surface) when voltage is applied to the cell. A refractive index ellipsoid (33b) has an oval shape shown in FIG. 4(b) when voltage is applied to the cell. Therefore, the liquid crystal cell having a retardation shown in FIG. 3(b) transmits light along a direction (34). The direction (34) is an orthographic projection of an optic axis of the liquid crystal molecule in the cell to the cell substrate surface.

Figure 5:
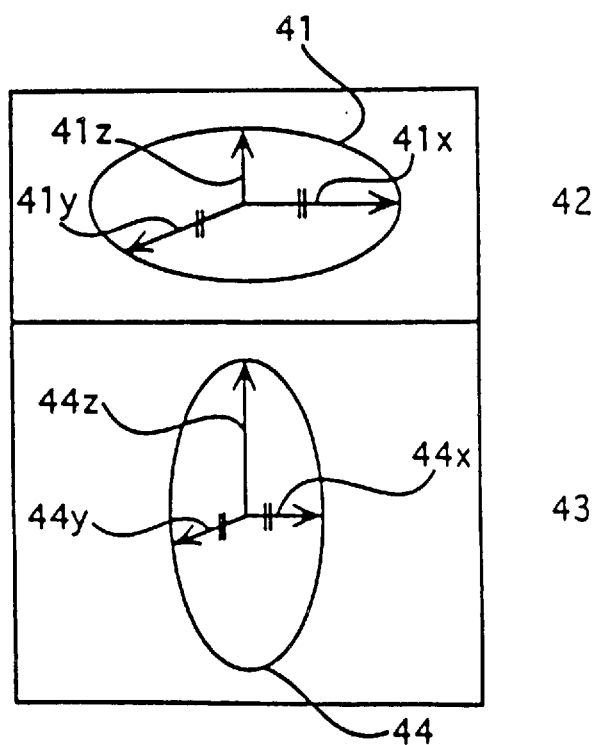
FIG. 5 schematically illustrates a refractive index ellipsoid of a positive uniaxial liquid crystal cell and a refractive index ellipsoid of a negative uniaxial optical compensatory sheet.

FIG. 5 schematically illustrates a refractive index ellipsoid of a positive uniaxial liquid crystal cell and a refractive index ellipsoid of a negative uniaxial optical compensatory sheet.

Where a positive uniaxial optical anisotropy is caused in a liquid crystal cell (43), a refractive index ellipsoid (44), which is formed by refractive indexes in plane (44x, 44y) and a refractive index along a vertical direction (44z), has a shape like a standing football. If a liquid crystal cell having a football-like (not spherical) refractive index ellipsoid is viewed along an inclined direction (15 in FIG. 2), retardation is caused in the cell. The retardation is canceled by a negative uniaxial optical compensatory sheet (42) to prevent transmission of light.

The negative uniaxial optical compensatory sheet (42) has a refractive index ellipsoid (41) having a shape like a pressed beach ball, which is formed by refractive indexes in plane (41x, 41y) and a refractive index along a vertical direction (41z). Therefore, the sum of 41x and 44x, the sum of 41y and 44y and the sum 41z and 44z are identical values. As a result, the retardation caused in the liquid crystal cell is canceled.

The optical compensatory sheet of the present invention has another function of preventing transmission of light incident from an inclined direction when voltage is not applied to the cell as well as a function of improving the viewing angle when voltage is not applied to the cell (described above referring to FIG. 3).

Figure 6:
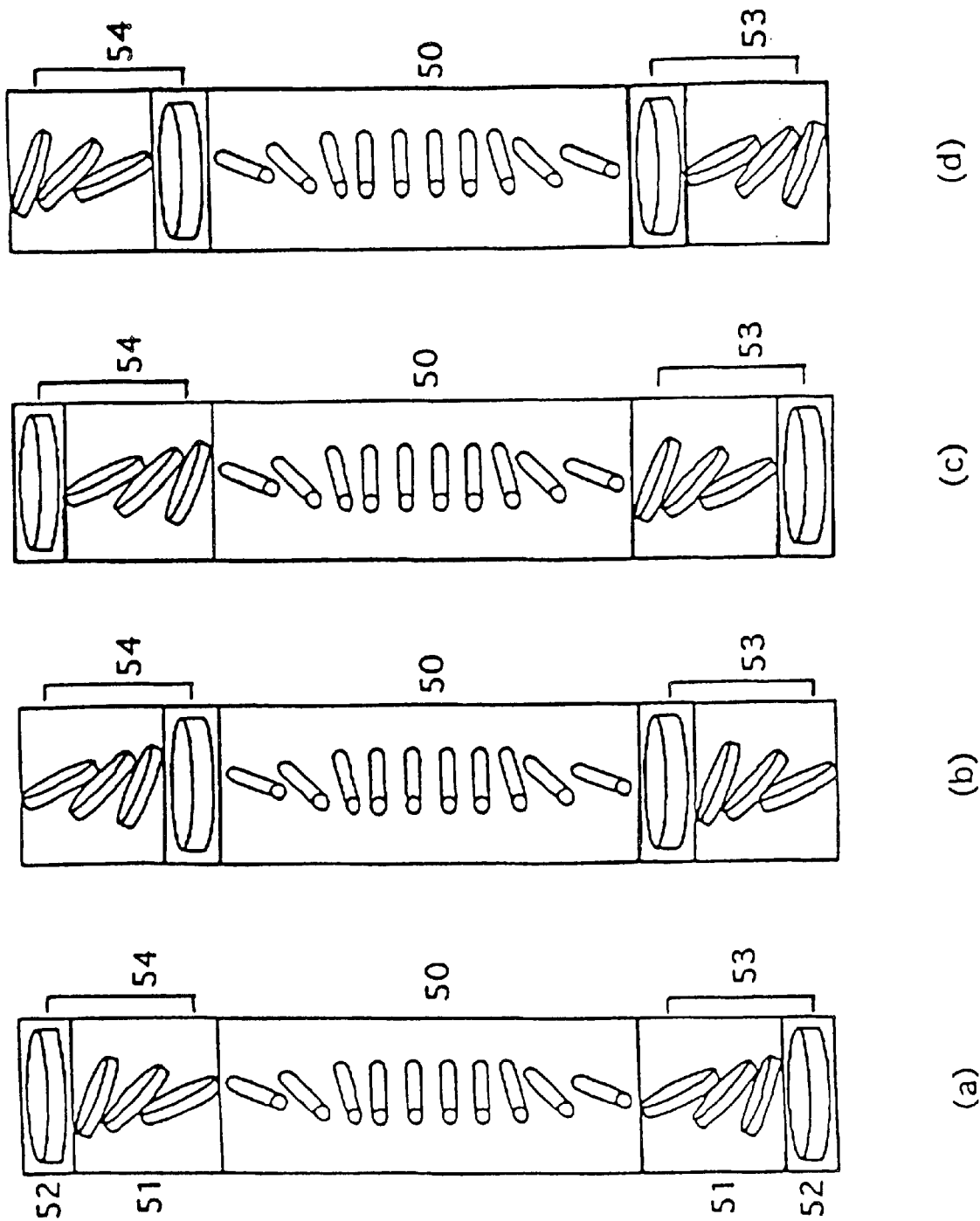
FIG. 6 is a sectional view schematically illustrating combinations of a liquid crystal cell of a VA mode and two optical compensatory sheets.

FIG. 6 is a sectional view schematically illustrating combinations of a liquid crystal cell of a vertical alignment mode and two optical compensatory sheets.

As is shown in FIG. 6, the optical compensatory sheets (53, 54) are combined with a VA liquid crystal cell (50) according to four variations (a) to (d).

According to the variations (a) and (c), optically anisotropic layers (51) containing discotic liquid crystal molecules of the optical compensatory sheets (53, 54) are attached to the VA liquid crystal cell (50). In the variation (a), the discotic liquid crystal molecules are aligned by an orientation layer (not shown in FIG. 6) arranged between the optically anisotropic layer (51) and the support (52). In the variation (c), the discotic liquid crystal molecules are aligned by an orientation layer (not shown in FIG. 6) arranged between the optically anisotropic layer (51) and the VA liquid crystal cell (50).

According to the variations (b) and (d), supports (52) of the optical compensatory sheets (53, 54) are attached to the VA liquid crystal cell (50). In the variation (b), the discotic liquid crystal molecules are aligned by an orientation layer (not shown in FIG. 5) arranged between the optically anisotropic layer (51) and the support (52). In the variation (c), the discotic liquid crystal molecules are aligned by an orientation layer (not shown in FIG. 6) arranged outside the optically anisotropic layer (51).

Figure 7:
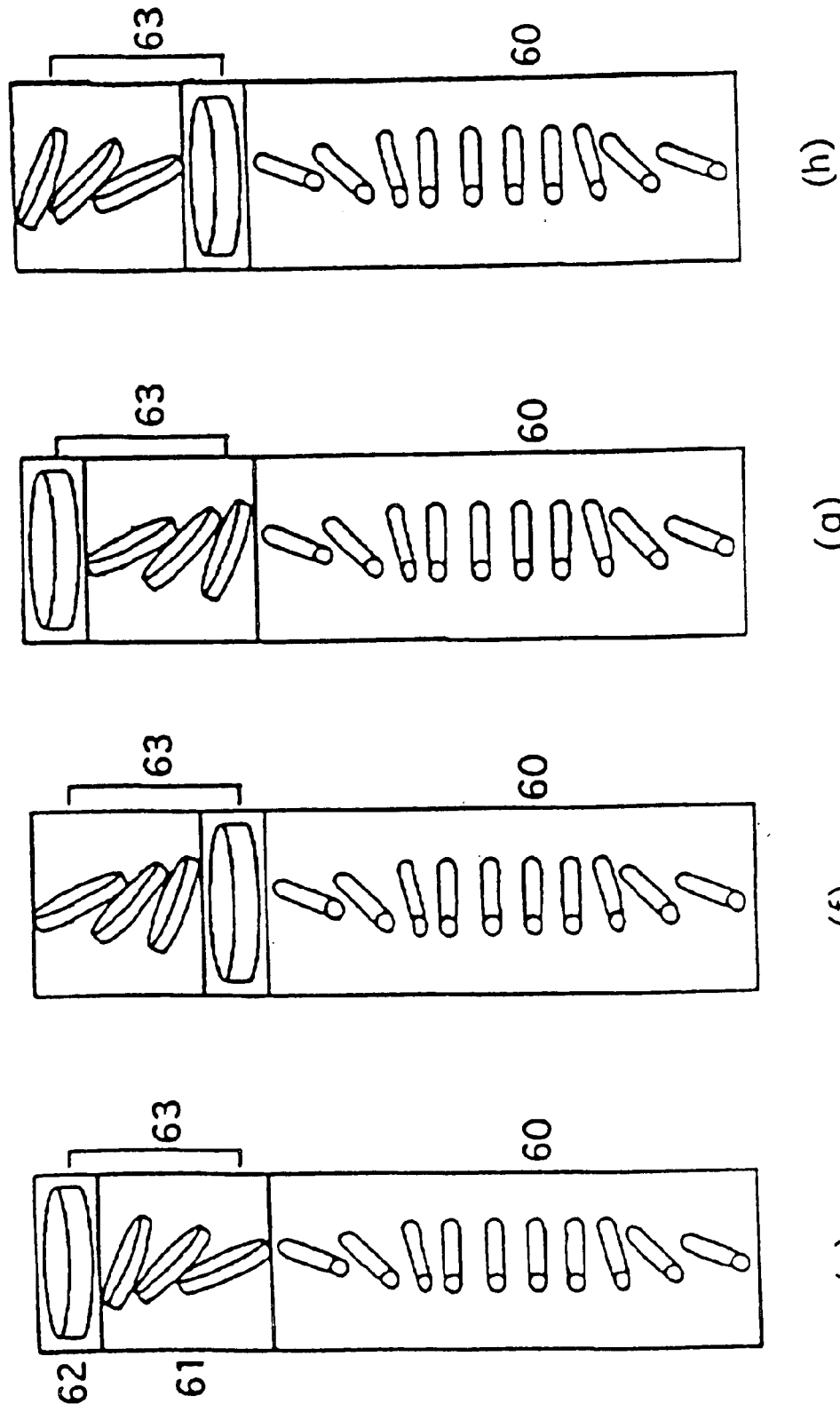
FIG. 7 is a sectional view schematically illustrating combinations of a liquid crystal cell of a VA mode and one optical compensatory sheet.

FIG. 7 is a sectional view schematically illustrating combinations of a liquid crystal cell of a vertical alignment mode and an optical compensatory sheet.

As is shown in FIG. 7, the optical compensatory sheet (63) of the second embodiment is combined with a VA liquid crystal cell (60) according to four variations (e) to (h).

According to the variations (e) and (g), an optically anisotropic layer (61) containing a discotic liquid crystal molecule of the optical compensatory sheet (63) is attached to the VA liquid crystal cell (60). In the variation (e), the discotic liquid crystal molecules are aligned by an orientation layer (not shown in FIG. 7) arranged between the optically anisotropic layer (61) and the support (62). In the variation (g), the discotic liquid crystal molecules are aligned by an orientation layer (not shown in FIG. 6) arranged between the optically anisotropic layer (61) and the VA liquid crystal cell (60).

According to the variations (f) and (h), a support (62) of the optical compensatory sheet (63) is attached to the VA liquid crystal cell (60). In the variation (f), the discotic liquid crystal molecules are aligned by an orientation layer (not shown in FIG. 6) arranged between the optically anisotropic layer (61) and the support (62). In the variation (h), the discotic liquid crystal molecules are aligned by an orientation layer (not shown in FIG. 7) arranged outside the optically anisotropic layer (61).

Figure 8:
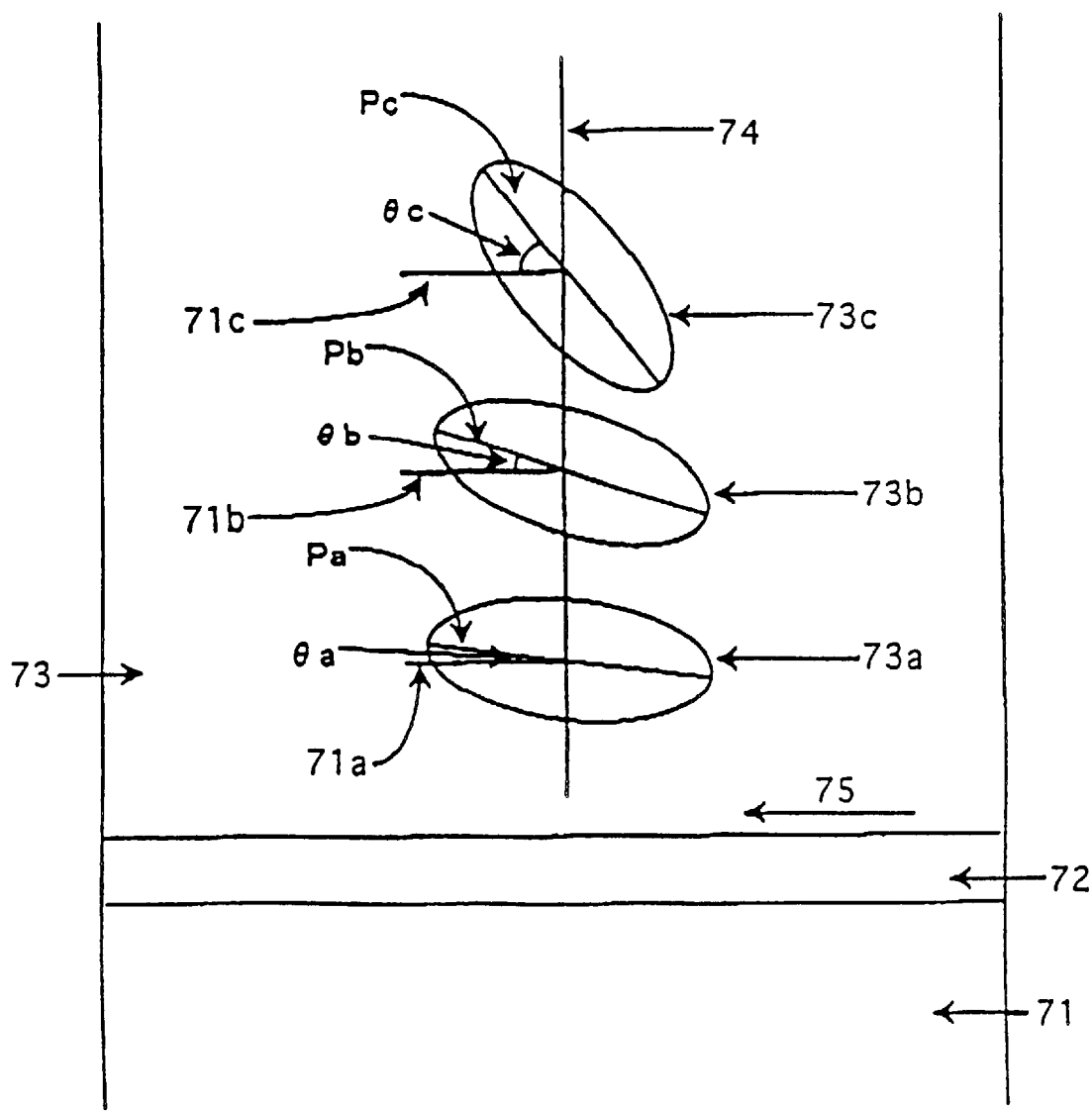
FIG. 8 is a sectional view schematically illustrating an optical compensatory sheet for a liquid crystal display of a VA mode.

FIG. 8 is a sectional view schematically illustrating a representative embodiment of an optical compensatory sheet.

The optical compensatory sheet shown in FIG. 8 comprises a support (71), an orientation layer (72) and an optically anisotropic layer (73) in the order. The layered structure corresponds to (a) and (b) in FIG. 6 and (e) and (f) in FIG. 6. The orientation layer (72) has an aligning function caused by rubbing the layer along a direction (75).

Discotic liquid crystal molecules (73a, 73b, 73c) contained in the optically anisotropic layer (73) are planer molecules. Each of the molecules has only one plane, namely discotic plane (Pa, Pb, Pc). The discotic planes (Pa, Pb, Pc) are inclined to planes (71a, 71b, 71c) parallel to the surface of the support (71). The angle between the discotic planes (Pa, Pb, Pc) and the paralleled planes (71a, 71b, 71c) are inclined angles ($\theta$a, $\theta$b, $\theta$c). As the distance between the molecule and the orientation layer (72) increases along a normal line (74) of the support (71), the inclined angles increases ($\theta$a<$\theta$b<$\theta$c).

The inclined angles ($\theta$a, $\theta$b, $\theta$c) are preferably in the range of 0 to 60°. The minimum inclined angle is preferably in the range of 0 to 55°, and more preferably in the range of 5 to 40°. The maximum inclined angle is preferably in the range of 5 to 60°, and more preferably in the range of 20 to 60°. The difference between the minimum and maximum angles is preferably in the range of 5 to 55°, and more preferably in the range of 10 to 40°.

An optical compensatory sheet has a function of improving the viewing angle. The function can be further improved where the inclined angles are changed as is shown in FIG. 8. The optical compensatory sheet shown in FIG. 8 has another function of preventing an image from reversion, gray-scale inversion and color contamination of a displayed image.

Figure 9:
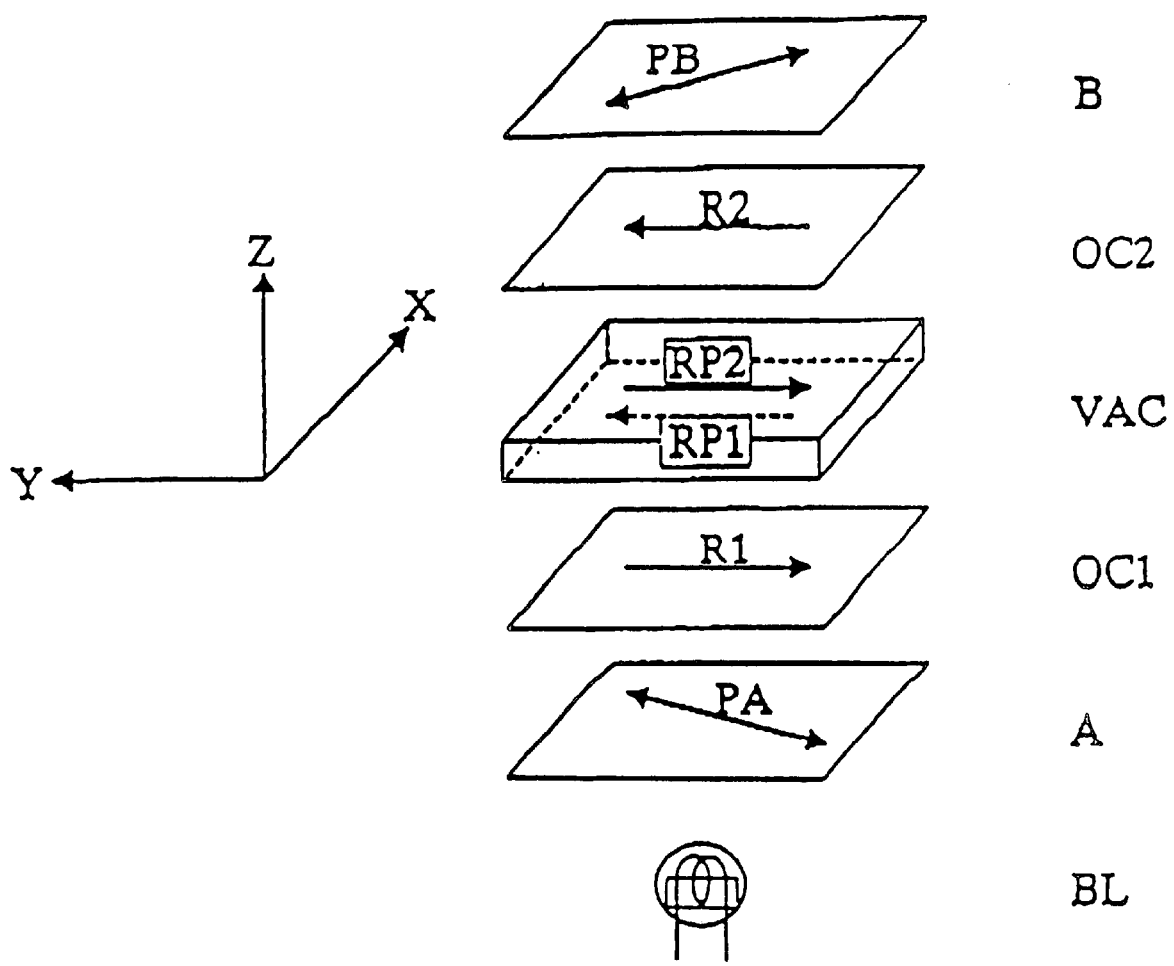
FIG. 9 is a sectional view schematically illustrating a representative embodiment of a liquid crystal display of a VA mode.

FIG. 9 is a sectional view schematically illustrating a representative embodiment of a liquid crystal display of a VA mode.

The liquid crystal display shown in FIG. 9 comprises a liquid crystal cell of a vertical alignment mode (VAC), a pair of polarizing elements (A, B) arranged on both sides of the liquid crystal cell, a pair of optical compensatory sheets (OC1, OC2) arranged between the liquid crystal cell and the polarizing elements, and a back light (BL). The pair of the optical compensatory sheets (OC1, OC2) are arranged, as is shown in FIG. 9. However, only one optical compensatory sheet can be arranged on one side of the liquid crystal cell.

The arrows (R1, R2) in the optical compensatory sheets (OC1, OC2) mean rubbing directions of orientation layers (corresponding to the arrow 75 in FIG. 8) provided on the optical compensatory sheets. In the liquid crystal display shown in FIG. 9, an optically anisotropic layers of the optical compensatory sheets (OC1, OC2) are attached to the liquid crystal cell (VAC). The optically anisotropic layers can be attached to the polarizing elements (A, B). The rubbing directions of an orientation layer (R1, R2) should be reversed if the optically anisotropic layers are attached to the polarizing elements.

The arrows (RP1, RP2) in the liquid crystal cell (VAC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) is preferably essentially parallel (or reversal parallel) to the rubbing directions in the liquid crystal cell (RP1, RP2). The transmission axes of the polarizing elements (PA, PB) are preferably essentially parallel or perpendicular to each other.

The term "essentially parallel (or reversal parallel) or perpendicular" means that a margin for error based on the exactly parallel (or reversal parallel) or perpendicular angle is in the range of ±20°. The margin for error is preferably in the range of ±15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 80°, more preferably in the range of 20 to 70°, and most preferably in the range of 35 to 55°.

The optical compensatory sheet used in the liquid crystal display of the VA mode has a direction of the minimum retardation, which is preferably present neither in plane nor along a normal line of the sheet.

The optical characteristics of the optical compensatory sheet depend on those of the optically anisotropic layer and the support and on arrangement of the layer and the support. With respect to the optical characteristics, detailed descriptions are given below.

The optical characteristics of (1) the optical anisotropic layer, (2),the support and (3) the optical compensatory sheet include a Re retardation value, a Rth retardation value and an angle between a direction of the minimum retardation and a normal line of the sheet ($\beta$).

The Re and Rth retardation values are defined above about the retardation value of the cellulose ester support. In the definitions of the optical anisotropic layer and the optical compensatory sheet, nx, ny and nz (described above about the cellulose ester support) mean principle refractive indexes satisfying the formula of $nx \geq ny \geq nz$.

In the case that two optical compensatory sheets are used in the liquid crystal display of a VA mode, each of the optical compensatory sheets preferably has a Re retardation value in the range of −5 to 5 nm. Accordingly, the absolute Re retardation value of the optical compensatory sheet ($Re^{31}$) preferably satisfies the formula of $0 \leq |R^{31}| \leq 5$.

The optically anisotropic layer and the support are preferably so arranged that the slow axis of the optically anisotropic layer is essentially perpendicular to that of the support, to adjust $Re^{31}$ within the above-mentioned range. Further, each of the optically anisotropic layer and the support preferably has a Re retardation value satisfying the following formula:

$$|Re^1| - Re^2| \leq 5 \text{ nm}$$

in which $Re^1$ is the absolute Re retardation value of the optically anisotropic layer, and $Re^2$ is the absolute Re retardation value of the support.

In the case that one optical compensatory sheet is used in the liquid crystal display of a VA mode, the optical compensatory sheet preferably has a retardation value in plane in the range of −10 to 10 nm. Accordingly, the absolute Re retardation value of the optical compensatory sheet ($Re^{32}$) preferably satisfies the formula of $0 \leq |R^{32}| \leq 0$.

The optically anisotropic layer and the support are preferably so arranged that the slow axis of the optically anisotropic layer is essentially perpendicular to that of the support, to adjust $Re^{32}$ within the above-mentioned range. Further, each of the optically anisotropic layer and the support preferably has retardation in plane satisfying the following formula:

$$|Re^1| - Re^2| \leq 10 \text{ nm}$$

in which $Re^1$ is the absolute retardation value in plane of the optically anisotropic layer, and $Re^2$ is the absolute retardation value in plane of the support.

Preferred optical characteristics of (1) the optical anisotropic layer, (2) the support and (3) the optical compensatory sheet are shown below. The unit of Re and Rth is nm. The superscripted numbers 1, 2 and 3 mean values of the optical anisotropic layer, the support and the optical compensatory sheet, respectively. The retardation values of Rth and Re ($Rth^2$ and $Re^2$) of the support have been described above for the cellulose ester support. The meanings of $R^{31}$ and $R^{32}$ are described above. In the case that two or more supports are used, the $Re^2$ of the whole of the supports is the sum of the $Re^2$s of all the supports.

| Preferred range | More preferred | Most preferred |
|---|---|---|
| $0 < |Re^1| \leq 200$ | $5 \leq |Re^1| \leq 150$ | $10 \leq |Re^1| \leq 100$ |
| $0 \leq |Re^2| \leq 200$ | $5 \leq |Re^2| \leq 150$ | $10 \leq |Re^2| \leq 100$ |
| $0 \leq |Re^{31}| \leq 4.5$ | $0 \leq |Re^{31}| \leq 4$ | $0 \leq |Re^{31}| \leq 3.5$ |
| $0 \leq |Re^{32}| \leq 9$ | $0 \leq |Re^{32}| \leq 8$ | $0 \leq |Re^{32}| \leq 7$ |
| $10 \leq |Rth^1| \leq 400$ | $20 \leq |Rth^1| \leq 300$ | $30 \leq |Rth^1| \leq 200$ |
| $10 \leq |Rth^3| \leq 600$ | $60 \leq |Rth^3| \leq 500$ | $100 \leq |Rth^3| \leq 400$ |
| $0° < \beta^1 \leq 60°$ | $0° < \beta^1 \leq 50°$ | $0° < \beta^1 \leq 40°$ |
| $0° \leq \beta^2 \leq 10°$ | $0° \leq \beta^2 \leq 5°$ | $0° \leq \beta^2 \leq 3°$ |
| $0° \leq \beta^3 \leq 50°$ | $0° < \beta^3 \leq 45°$ | $0° < \beta^3 \leq 40°$ |

[Liquid Crystal Display of OCB or HAN Mode]

The cellulose ester film of the invention is also advantageously used as a support of the optical compensatory sheet for a liquid crystal display of an optically compensatory bend (OCB) mode or a hybrid aligned nematic (HAN) mode.

The liquid crystal displays of the OCB mode and the HAN mode are described below referring to FIGS. 10 to 15.

Figure 10:
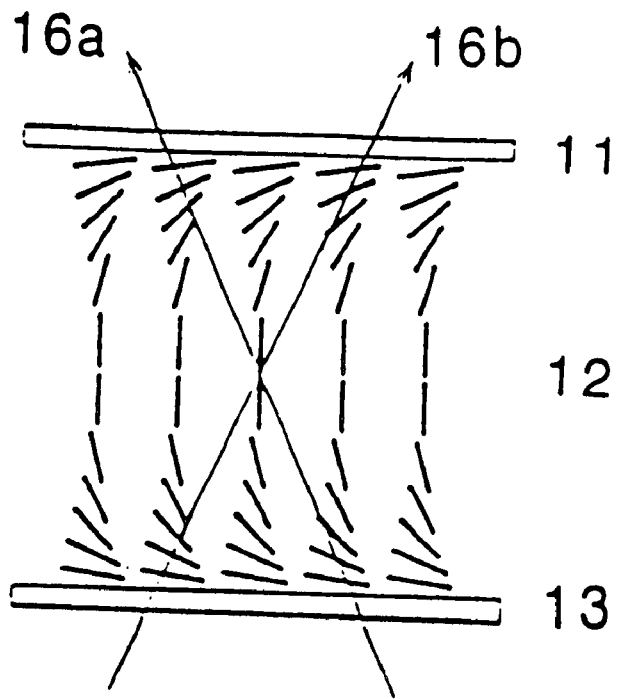
FIG. 10 is a sectional view schematically illustrating alignment of liquid crystal molecules in a liquid crystal cell of an OCB mode.

FIG. 10 is a sectional view schematically illustrating alignment of liquid crystal molecules in an optically compensatory bend (OCB) liquid crystal cell. The cell of FIG. 10 shows a black image, which corresponds to a normally white mode when voltage is applied to the cell or a normally black mode when voltage is not applied to the cell.

As is shown in FIG. 10, a liquid crystal cell comprises an upper substrate (11), a lower substrate (13) and liquid crystal molecules (12) sealed between the substrates. In the liquid crystal cell of the OCB mode, the birefringence of liquid crystal molecules (12) near the upper substrate (11) is large along a direction of light (16a), while the birefringence of liquid crystal molecules (12) near the lower substrate (13) is small. Along another direction of light (16b), which is symmetric based on the normal line of the substrates, the birefringence of liquid crystal molecules (12) near the upper substrate (11) is small, while the birefringence of liquid crystal molecules (12) near the lower substrate (13) is large. As is described above, the retardation values of the OCB liquid crystal cell are symmetric based on the normal line of the substrates. Accordingly, the cell has a function of optically compensate itself. Therefore, the OCB cell has a large viewing angle in principle.

Figure 11:
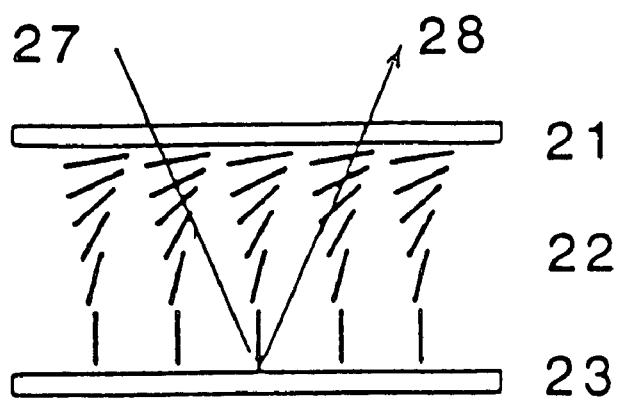
FIG. 11 is a sectional view schematically illustrating alignment of liquid crystal molecules in a liquid crystal cell of a HAN mode.

FIG. 11 is a sectional view schematically illustrating alignment of liquid crystal molecules in a hybrid aligned nematic (HAN) liquid crystal cell. The cell of FIG. 11 shows a black image, which corresponds to a normally white mode when voltage is applied to the cell or a normally black mode when voltage is not applied to the cell.

As is shown in FIG. 11, a liquid crystal cell comprises an upper substrate (21), a lower substrate (23) and liquid crystal molecules (22) sealed between the substrates. In the cell of the HAN mode, the birefringence of liquid crystal molecules (22) near the upper substrate (21) is large along the direction of the incident light (27), while the birefringence of liquid crystal molecules (22) near the lower substrate (23) is small. Along the direction of the reflected light (28), the birefringence of liquid crystal molecules (22) near the upper substrate (21) is small, while the birefringence of liquid crystal molecules (22) near the lower substrate (23) is large. As is described above, the retardation values of the incident light and the reflected light are symmetric. Accordingly, the cell has a function of optically compensate itself. Therefore, the HAN cell has a large viewing angle in principle.

Even if the OCB or HAN cell is used, the light transmittance increases within the black area to decrease a contrast of an image where the viewing is further enlarged. The optical compensatory sheet is used to keep the contrast when light is incident along an inclined direction, to improve the viewing angle and the front contrast.

A positive uniaxial liquid crystal cell (displaying black) can be optically compensated by a negative uniaxial optical compensatory sheet, as is described above referring to FIG. 5.

Figure 12:
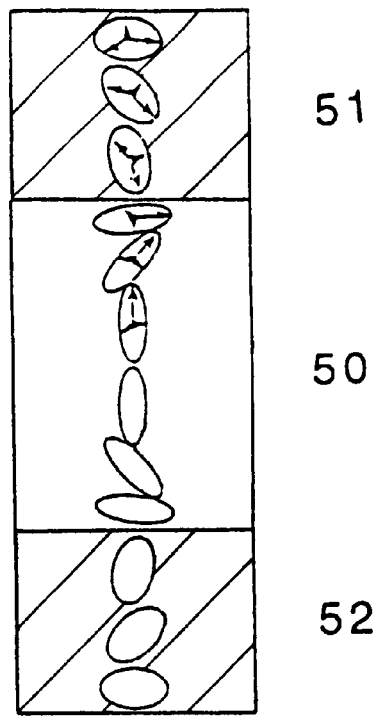
FIG. 12 is a sectional view schematically illustrating a combination of a liquid crystal cell of an OCB mode and two optical compensatory sheets.

FIG. 12 is a sectional view schematically illustrating a combination of a liquid crystal cell of the OCB mode and two optical compensatory sheets of the present invention.

As is shown in FIG. 12, the two optical compensatory sheets are preferably so arranged that the liquid crystal cell of the OCB mode (50) is provided between the optically anisotropic layers (51, 52). The discotic liquid crystal molecules of the optically compensatory sheets (51, 52) are aligned so that they may optically compensate the alignment of the liquid crystal molecules of the liquid crystal cell (50) of the OCB mode.

Figure 13:
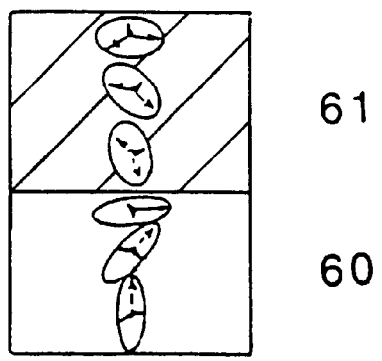
FIG. 13 is a sectional view schematically illustrating a combination of a liquid crystal cell of a HAN mode and one optical compensatory sheet.

FIG. 13 is a sectional view schematically illustrating a combination of a liquid crystal cell of the HAN mode and one optical compensatory sheet.

As is shown in FIG. 13, the optical compensatory sheet is preferably so arranged that the optically anisotropic layer

(61) is provided on the display surface of the liquid crystal cell of the HAN mode (60). The discotic liquid crystal molecules of the optically compensatory sheet (61) are aligned so that they may optically compensate the alignment of the liquid crystal molecules of the liquid crystal cell of the HAN mode.

As is shown in FIGS. 12 and 13, the alignment of the liquid crystal molecules in the cell of the OCB or HAN mode can be optically compensated by the optically anisotropic layer containing a discotic liquid crystal molecule. However, the retardation of the liquid crystal cell cannot be sufficiently corrected by only the optically anisotropic layer. Further, the retardation caused in the optically anisotropic layer cannot be corrected by the layer itself. Therefore, the above-described optically anisotropic support (cellulose ester film) is used to correct the retardation.

The combinations of the optically anisotropic layer and the optical anisotropic support are the same as those described above for the liquid crystal display of the VA mode shown in FIG. 8.

Figure 14:
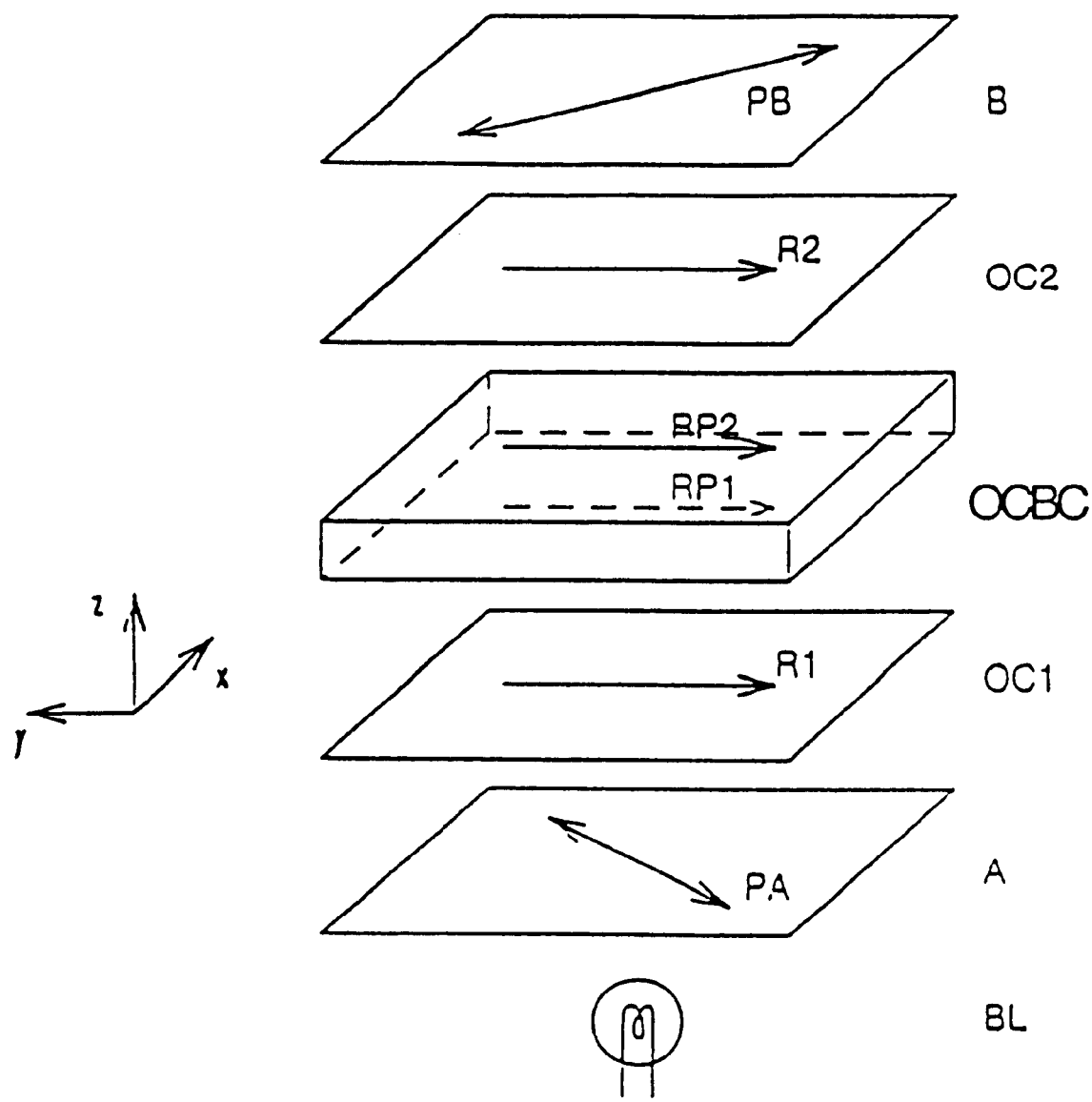
FIG. 14 is a sectional view schematically illustrating a representative embodiment of a liquid crystal display of an OCB mode.

FIG. 14 is a sectional view schematically illustrating a representative embodiment of a liquid crystal display of an OCB mode.

The liquid crystal display shown in FIG. 14 comprises a liquid crystal cell of an optically compensatory bend mode (OCBC), a pair of polarizing elements (A, B) arranged on both sides of the liquid crystal cell, a pair of optical compensatory sheets (OC1, OC2) arranged between the liquid crystal cell and the polarizing elements, and a back light (BL). The pair of the optical compensatory sheets (OC1, OC2) are arranged, as is shown in FIG. 14. However, only one optical compensatory sheet can be arranged on one side of the liquid crystal cell.

The arrows (R1, R2) in the optical compensatory sheets (OC1, OC2) mean rubbing directions of orientation layers provided on the optical compensatory sheets. In the liquid crystal display shown in FIG. 14, optically anisotropic layers of the optical compensatory sheets (OC1, OC2) are attached to the liquid crystal cell (OCBC). The optically anisotropic layers can be attached to the polarizing elements (A, B). The rubbing directions of an orientation layer (R1, R2) should be reversed if the optically anisotropic layers are attached to the polarizing elements.

The arrows (RP1, RP2) in the liquid crystal cell (OCBC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) are preferably essentially parallel (or reversal parallel) to the rubbing directions in the liquid crystal cell (RP1, RP2), respectively. The transmission axes of the polarizing elements (PA, PB) are preferably essentially parallel or perpendicular to each other.

The term "essentially parallel (or reversal parallel) or perpendicular" means that a margin for error based on the exactly parallel (or reversal parallel) or perpendicular angle is in the range of ±20°. The margin for error is preferably in the range of ±15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 80°, more preferably in the range of 20 to 70°, and most preferably in the range of 35 to 55°.

Figure 15:
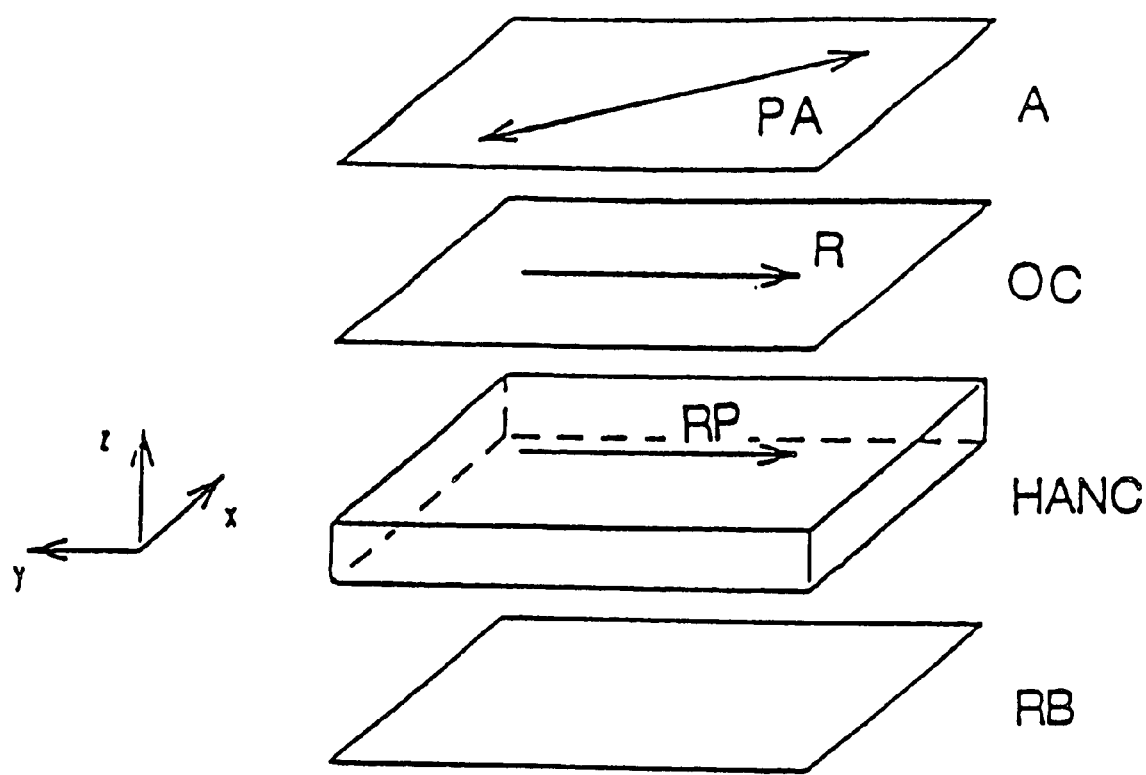
FIG. 15 is a sectional view schematically illustrating a representative embodiment of a liquid crystal display of a HAN mode.

FIG. 15 is a sectional view schematically illustrating a representative embodiment of a liquid crystal display of a HAN mode.

The liquid crystal display shown in FIG. 15 comprises a liquid crystal cell of a hybrid aligned nematic mode (HANC), a polarizing element (A) arranged on the display side of the liquid crystal cell, an optical compensatory sheet (OC) arranged between the liquid crystal cell and the polarizing element, and a reflection board (RB).

The arrow (R) in the optical compensatory sheet (OC) means a rubbing direction of an orientation layer provided on the optical compensatory sheet.

The arrow (RP) in the liquid crystal cell (HANC) means a rubbing direction of an orientation layer provided on the cell substrates.

The arrow (PA) in the polarizing element (A) means the transmission axis of light polarized in the element.

The rubbing direction in the optical compensatory sheet (R) is preferably essentially parallel (or reversal parallel) to the rubbing direction in the liquid crystal cell (RP).

The term "essentially parallel (or reversal parallel) or perpendicular" means that a margin for error based on the exactly parallel (or reversal parallel) or perpendicular angle is in the range of ±20°. The margin for error is preferably in the range of ±15°, more preferably in the range of ±10°, and most preferably in the range of ±5°.

The angle between the rubbing direction in the liquid crystal cell (RP) and the transmission axis of the polarizing element (PA) is preferably in the range of 10 to 80°, more preferably in the range of 20 to 70°, and most preferably in the range of 35 to 55°.

The optical compensatory sheet used in the liquid crystal display of the OCB or HAN mode has a direction of the minimum retardation, which is preferably present neither in plane nor along a normal line of the sheet.

The optical characteristics of the optical compensatory sheet depend on those of the optically anisotropic layer and the support and on arrangement of the layer and the support. With respect to the optical characteristics, detailed descriptions are given below.

The optical characteristics of (1) the optical anisotropic layer, (2) the support and (3) the optical compensatory sheet include a Re retardation value and a Rth retardation value. In the liquid crystal cell of the OCB or HAN mode, the optical characteristics of the optical compensatory sheet are preferably adjusted according to those of the OCB or HAN cell.

The Re and Rth retardation values are defined above about the retardation value of the cellulose ester support. In the definitions of the optical anisotropic layer and the optical compensatory sheet, nx, ny and nz (described above about the cellulose ester support) mean principle refractive indexes satisfying the formula of $nx \geq ny \geq nz$.

In the case that two optical compensatory sheets are used in the liquid crystal display, the Re retardation value of the optical compensatory sheet ($Re^3$) and the Re retardation value of the liquid crystal cell ($Re^4$) preferably satisfy the following formula.

$$Re^4 - 20 \leq |Re^3| \times 2 \leq Re^4 + 20$$

In the case that one optical compensatory sheet is used in the liquid crystal display, the Re retardation value of the optical compensatory sheet ($Re^3$) and the Re retardation value of the liquid crystal cell ($Re^4$) preferably satisfy the following formula.

$$Re^4 - 20 \leq |Re^3| \leq Re^4 + 20$$

Preferred optical characteristics of (1) the optical anisotropic layer and (3) the optical compensatory sheet are shown below. The unit of Re and Rth is nm. The superscripted numbers 1, 2 and 3 mean values of the optical anisotropic layer, the support and the optical compensatory sheet, respectively. The retardation values of Rth and Re ($Rth^2$ and $Re^2$) of the support have been described above for the cellulose ester support. In the case that two or more supports are used, the $Re^2$ of the whole of the supports is the sum of the $Re^2$s of all the supports. The Re retardation value of the optical compensatory sheet ($Re^3$) in plane is adjusted by that of the cell in plane ($Re^4$), according to the above formulas.

| Preferred range | More preferred | Most preferred |
|---|---|---|
| $0 < |Re^1| \leq 200$ | $5 \leq |Re^1| \leq 150$ | $10 \leq |Re^1| \leq 100$ |
| $0 \leq |Re^2| \leq 200$ | $5 \leq |Re^2| \leq 150$ | $10 \leq |Re^2| \leq 100$ |
| $0 \leq |Re^3| \leq 4.5$ | $0 \leq |Re^3| \leq 4$ | $0 \leq |Re^3| \leq 3.5$ |
| $50 \leq |Rth^1| \leq 1{,}000$ | $50 \leq |Rth^1| \leq 800$ | $100 \leq |Rth^1| \leq 500$ |
| $50 \leq |Rth^3| \leq 1{,}000$ | $60 \leq |Rth^3| \leq 500$ | $100 \leq |Rth^3| \leq 400$ |

EXAMPLE 1

With 45 weight parts of cellulose acetate (average acetic acid content: 60.9%), 0.68 weight part of the discotic compound (222), 232.72 weight parts of methylene chloride, 42.57 weight parts of methanol and 8.50 weight parts of n-butanol were mixed at room temperature to prepare a solution (dope).

The solution (dope) was cast on a band by means of a band casting machine (effective length: 6 m). The dry thickness of the formed film was 100 μm.

The retardation value ($Rth^{550}$) along the thickness direction of the prepared cellulose acetate film was measured at the wavelength of 550 nm by means of an ellipsometer (M-150, Japan Spectrum Co., Ltd.). The result is set forth in Table 1.

(222)

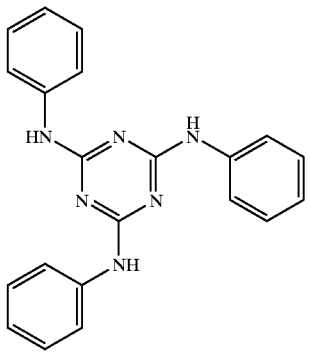

Comparison Example 1

The procedure of Example 1 was repeated except that the discotic compound (222) was not incorporated, to prepare a cellulose acetate film. The films were evaluated in the same manner as Example 1. The result is set forth in Table 1.

EXAMPLES 2 AND 3

The procedure of Example 1 was repeated except that the discotic compound (295) or (4) was used in place of the compound (222) in the same amount, to prepare a cellulose acetate film. The film was evaluated in the same manner as Example 1. The results are set forth in Table 1.

(295)

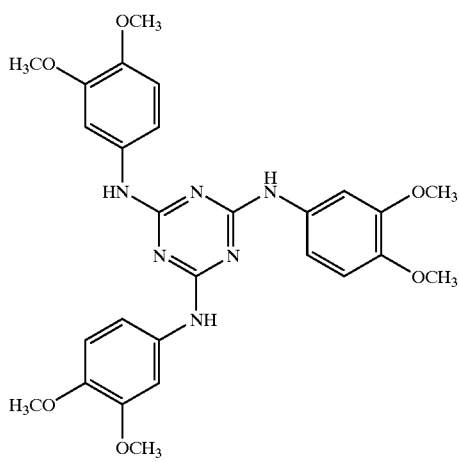

(4)

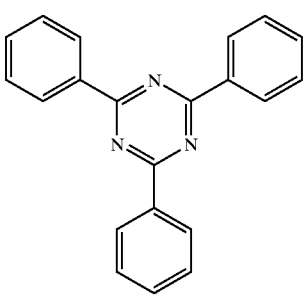

TABLE 1

| Film | Discotic compound | Retardation value ($Rth^{550}$) |
|---|---|---|
| Comparison Ex. 1 | None | 20 nm |
| Example 1 | (222) | 198 nm |
| Example 2 | (295) | 181 nm |
| Example 3 | (4) | 201 nm |

EXAMPLE 4

With 45 weight parts of cellulose acetate (average acetic acid content: 60.9%), 0.68 weight part of the discotic compound (222), 2.75 weight parts of triphenyl phosphate (plasticizer), 2.20 weight parts of biphenyldiphenyl phosphate, 232.72 weight parts of methylene chloride, 42.57 weight parts of methanol and 8.50 weight parts of n-butanol were mixed at room temperature to prepare a solution (dope).

The solution (dope) was cast on a band by means of a band casting machine (effective length: 6 m). The dry thickness of the formed film was 100 μm.

The retardation value ($Rth^{550}$) along the thickness direction of the prepared cellulose acetate film was measured at the wavelength of 550 nm by means of an ellipsometer (M-150, Japan Spectrum Co., Ltd.). Further, the surface of the film was observed with eyes to determine whether bleeding-out occurred or not. The results are set forth in Table 2.

Comparison Example 2

The procedure of Example 4 was repeated except that the discotic compound (222) was not incorporated, to prepare a cellulose acetate film. The film was evaluated in the same manner as Example 4. The result is set forth in Table 2.

EXAMPLES 5 AND 6

The procedure of Example 4 was repeated except that the discotic compound (229) or (14) was used in place of the compound (222) in the same amount, to prepare a cellulose acetate film. The films were evaluated in the same manner as Example 4. The results are set forth in Table 2.

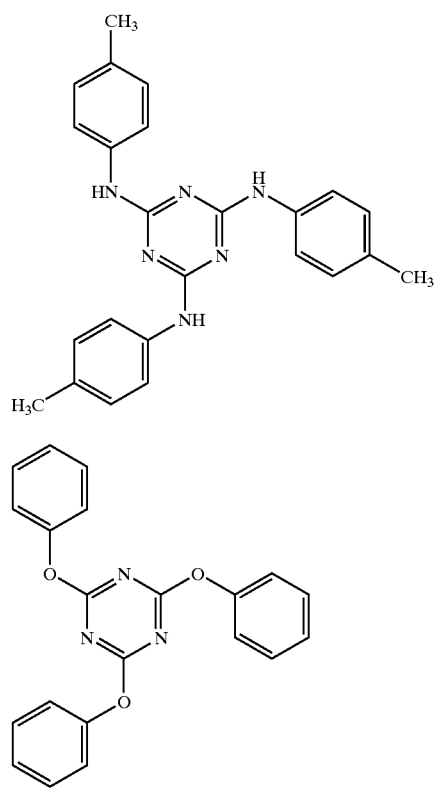

TABLE 2

| Film | Discotic compound | $Rth^{550}$ | Bleeding out |
|---|---|---|---|
| Comp. Ex. 2 | None | 50 nm | Not observed |
| Example 4 | (222) | 120 nm | Not observed |
| Example 5 | (229) | 117 nm | Not observed |
| Example 6 | (14) | 109 nm | Not observed |

EXAMPLE 7

(Preparation of Liquid Crystal Cell)

On a glass plate having an ITO electrode, an orientation layer of polyimide was provided and subjected to a rubbing treatment. The procedure was repeated to prepare two substrates, and the substrates are arranged face-to-face so that the cell gap might be 10 μm. Between them, a liquid crystal (ZLI1132, Merck & Co., Inc.) was introduced to prepare a liquid crystal cell of an OCB mode.

(Preparation of Liquid Crystal Display)

Two cellulose acetate films prepared in Example 4 were arranged on both sides of the above liquid crystal cell as optical compensatory sheets. Two polarizing elements were arranged outside the sheets.

Voltage of a square wave (55 Hz) was applied to the liquid crystal cell to display an image. Thereby, it was confirmed that the display gave a clear image without undesirable coloring.

EXAMPLE 8

(Support of Optical Compensatory Sheet)

The cellulose acetate film prepared in Example 4 was used as a support of an optical compensatory sheet.

(Formation of Orientation Layer)

A coating solution of the following composition was coated on the cellulose ester support by means of a slide coater. The coating amount was 25 ml/m². The coated layer was dried with air at 60° C. for 60 seconds, and further air dried at 90° C. for 150 seconds to form an orientation layer. The layer was then subjected to a rubbing treatment in which the rubbing direction was parallel to the slow axis of the support.

| Coating solution for orientation layer | |
|---|---|
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured polyvinyl alcohol)

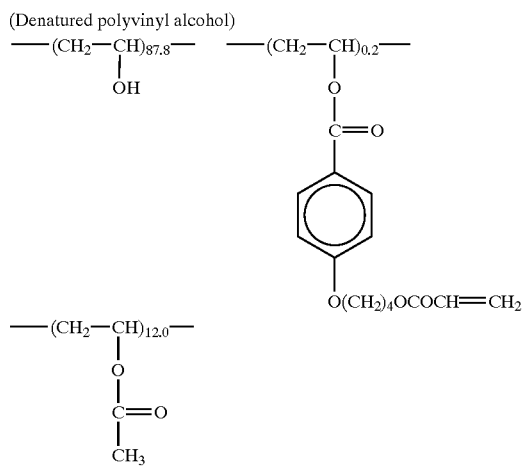

(Formation of Optically Anisotropic Layer)

In 8.43 g of methyl ethyl ketone, 1.8 g of the following discotic liquid crystal molecule, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by means of a wire bar of #2.5. The sheet was adhered to a metal frame, and heated in a thermostat at 130° C. for 2 minutes to align the discotic liquid crystal molecules. The sheet was irradiated with an ultraviolet ray at 130° C. for 1 minute by means of a high pressure mercury lamp of 120 W/cm. The sheet was cooled to room temperature to obtain an optical compensatory sheet (1).

(Discotic Liquid Crystal Molecule)

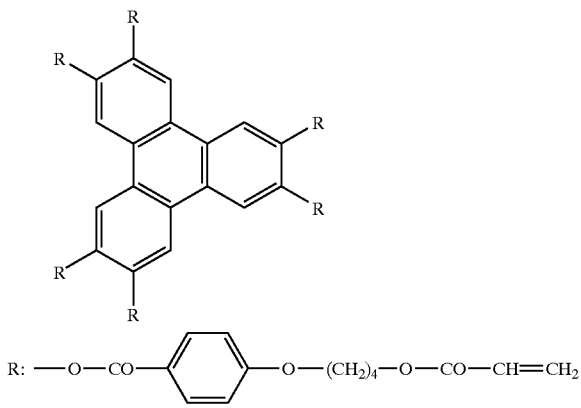

(Evaluation of Optical Compensatory Sheet)

The thickness of the optically anisotropic layer was about 1.0 μm. The retardation value of the optically anisotropic layer was measured along the rubbing direction. As a result, a direction having retardation of 0 was not found in the optically anisotropic layer.

The average inclined angle of the optic axis of the optically anisotropic layer, namely the angle between the direction of the minimum retardation and the normal line of the sheet was 280° ($\beta^1$=28°). The Re retardation value was 14 nm ($Re^1$=14), and the Rth retardation value was 35 nm ($Rth^1$=35).

The optical compensatory sheet (1) was vertically sliced along the rubbing direction by means of a micro tome, to obtain a ultra-thin section (sample). The sample was placed an atmosphere of $OSO_4$ for 48 hours to dye the sample. The dyed sample was observed with a transparent electron microscope (TEM) to obtain a microscopic photograph. In the sample, the acryloyl group of the discotic liquid crystal molecule was dyed to show an image in the photograph.

Upon checking the photograph, the discotic units in the optically anisotropic layer were inclined from the surface plane of the support. The inclined angle continuously increased according to the distance from the surface of the substrate increased.

(Preparation of VA Liquid Crystal Cell)

To a 3 wt. % aqueous solution of polyvinyl alcohol, 1 wt. % of octadecyldimethylammonium chloride (coupling agent) was added. The mixture was coated on a glass plate having an ITO electrode by means of a spin coater. After heating the coating layer at 160° C., the layer was subjected to a rubbing treatment to form an orientation layer for vertical alignment. The orientation layers were formed on two glass plates so that the rubbing direction on one glass plate might be reverse to that on the other plate. The two glass plates were made to face each other so that the orientation layers might be inside. The cell gap (d) was 5.5 μm A liquid crystal mixture (Δn: 0.05) comprising an ester liquid crystal compound and an ethane liquid crystal compound was injected into the cell gap to prepare a liquid crystal cell of a vertical alignment mode. The product of Δn and d was 275 nm.

(Preparation of Liquid Crystal Display of VA Mode)

Two optical compensatory sheets (1) was arranged on both sides of the liquid crystal cell of a vertical alignment mode. The optically anisotropic layer of the optical compensatory sheet was made to face the glass plate of the liquid crystal cell. The rubbing direction of the orientation layer of the liquid crystal cell was reversely parallel to that of the orientation layer of the optical compensatory sheet. Two polarizing elements were arranged on the optical compensatory sheets according to a crossed nicols arrangement.

Voltage of a square wave (55 Hz) was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by means of a meter (EZ-Contrast 160D, ELDIM). As a result, the contrast ratio (white/black) was 300, and the viewing angle giving a contrast ratio of not smaller than 10 along each direction of upward (U), downward (D), leftward (L) and rightward (R) was 70°.

EXAMPLE 9

(Support of Optical Compensatory Sheet)

The cellulose acetate film prepared in Example 4 was used as a cellulose ester support of an optical compensatory sheet.

(Formation of Orientation Layer)

A coating solution of the following composition was coated on the cellulose ester support by means of a slide coater. The coating amount was 25 ml/m². The coated layer was dried with air at 60° C. for 2 minutes to form an orientation layer.

The formed layer was subjected to a rubbing treatment. The rubbing direction was parallel to the slow axis of the support. The diameter of the rubbing roll, the speed of transferring the film, the rubbing angle and the rotating speed of the rubbing roll were 150 mm, 10 m/minute, 6° and 1,200 rpm, respectively.

| Coating solution for orientation layer | |
|---|---|
| 10 Wt. % aqueous solution of the denatured polyvinyl alcohol used in Example 8 | 24 g |
| Water | 73 g |
| Methanol | 23 g |
| 50 wt. % aqueous solution of glutaric aldehyde (cross-linking agent) | 0.2 g |

(Formation of Optically Anisotropic Layer)

In 3.4 g of methyl ethyl ketone, 1.8 g of the discotic liquid-crystal compound used in Example 8, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.01 g of cellulose acetate butyrate (CAB531-1.0, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by means of a wire bar of #6. The sheet was adhered to a metal frame, and heated in a thermostat at 140° C. for 3 minutes to align the discotic liquid crystal molecules. The sheet was irradiated with an ultraviolet ray at 140° C. for 1 minute by means of a high pressure mercury lamp of 120 W/cm. The sheet was cooled to room temperature to obtain an optical compensatory sheet (2).

(Evaluation of Optical Compensatory Sheet)

The thickness of the optically anisotropic layer was 2.0 μm. The retardation value of the optically anisotropic layer itself was measured along the rubbing direction. As a result, a direction having retardation of 0 was not found in the optically anisotropic layer. Simulation of. fitting the retardation values revealed a hydride retardation in which the negative uniaxes were changed from 4° to 68° successively along a thickness direction.

The retardation values of Re and Rth of the optically anisotropic layer were 42 nm and 134 nm ($Re^1$=42, $Rth^1$=134), respectively.

The optical compensatory sheet (2) was vertically sliced along the rubbing direction by means of a micro tome, to obtain a ultra-thin section (sample). The sample was placed an atmosphere of $OSO_4$ for 48 hours to dye the sample. The dyed sample was observed with a transparent electron microscope (TEM) to obtain a microscopic photograph. In the sample, the acryloyl group of the discotic liquid crystal molecule was dyed to show an image in the photograph.

Upon checking the photograph, the discotic units in the optically anisotropic layer were inclined from the surface plane of the support. The inclined angle continuously increased according to the distance from the surface of the substrate increased.

(Preparation of OCB Liquid Crystal Cell)

A polyimide membrane was formed on a glass plate having an ITO electrode as an orientation layer. On another glass plate with an ITO electrode, an orientation layer was formed. The orientation layers were subjected to a rubbing treatment. The rubbing direction on one glass plate was reverse to that on the other plate. The two glass plates were made to face each other so that the orientation layers might be inside. The cell gap (d) was 8 μm. A liquid crystal molecule having Δn of 0.1396 (ZLI1132, Merck & Co., Inc.) was injected into the cell gap to prepare a liquid crystal cell of an optically compensatory bend mode. The product of Δn and d was 1,109 nm. The Re retardation value was 90 nm ($Re^4$=90).

(Preparation of Liquid Crystal Display of OCB Mode)

Two optical compensatory sheets (2) was arranged on both sides of the liquid crystal cell of an optically compensatory bend mode. The optically anisotropic layer of the optical compensatory sheet was made to face the glass plate of the liquid crystal cell. The rubbing direction of the orientation layer of the liquid crystal cell was reversely parallel to that of the orientation layer of the optical compensatory sheet. Two polarizing elements were arranged on the optical compensatory sheet according to a crossed nicols arrangement.

Voltage of a square wave (55 Hz) was applied to the liquid crystal cell of the optically compensatory bend mode. An image was displayed according to an NW mode (black: 6V, white: 2V). A ratio of the transmittance (white/black) was measured as a contrast ratio. The upward, downward, leftward and rightward contrast ratios were measured by means of a meter (LCD-5000, Ohtsuka Electron Co., Ltd.). As a result, the viewing angles giving a contrast ratio of not smaller than 10 were 80° or more along upward (U) direction, 58° along downward (D) direction and 67° along l eft ward (L) or rightward (R) direction.

EXAMPLE 10

(Preparation of HAN Liquid Crystal Cell)

A polyimide membrane was formed on a glass plate having an ITO electrode as an orientation layer. The orientation layer was subjected to a rubbing treatment. Silicon oxide was evaporated on another glass plate having an ITO electrode to form an orientation layer. The two glass plates were made to face each other so that the orientation layers might be inside. The cell gap (d) was 4 μm. A liquid crystal molecule having Δn of 0.1396 (ZLI1132, Merck & Co., Inc.) was injected into the cell gap to prepare a liquid crystal cell of a hybrid aligned nematic mode. The product of Δn and d was 558 nm. The Re retardation value was 45 nm ($Re^4$=45).

(Preparation of Liquid Crystal Display of HAN Mode)

One optical compensatory sheet (2) prepared in Example 9 was arranged on a display side of the liquid crystal cell of a hybrid aligned nematic mode. The optically anisotropic layer of the optical compensatory sheet was made to face the glass plate of the liquid crystal cell. The rubbing direction of the orientation layer of the liquid crystal cell was reversely parallel to that of the orientation layer of the optical compensatory sheet. A polarizing element was arranged on the optical compensatory sheet in which the angle between the transmittance axis and the rubbing direction of the liquid crystal cell was 45°. A scattering plate was placed on the polarizing element. A mirror (reflecting board) was placed on the reverse side of the liquid crystal cell.

Light was irradiated to the liquid crystal cell of the hybrid aligned nematic mode. along the direction inclined by 20° from the normal line of the display surface. Voltage of a square wave (55 Hz) was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by means of a meter (bm-7, TOPCON). As a result, the viewing angles giving a contrast ratio of not smaller than 10 were 44° along upward (U) direction, 26° along downward (D) direction and 39° along leftward (L) or rightward (R) direction.

EXAMPLE 11

(Preparation of Cellulose Ester Film)

The following composition was placed in a mixing tank, and heated and stirred to prepare a cellulose ester solution.

| Cellulose ester solution | |
|---|---|
| Cellulose acetate (average acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol | 11 weight parts |

In another mixing tank, 16 weight parts of the following porphyrin compound (retardation increasing agent), 80 weight parts of methylene chloride and 20 weight parts of methanol were placed, heated and stirred to prepare a discotic compound solution.

(Porphyrin compound)

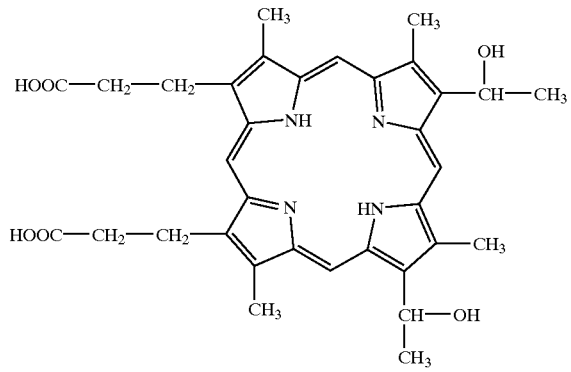

To 474 weight parts of the cellulose ester solution, 11 weight parts of the discotic compound solution was added and stirred well to prepare a dope. The amount of the discotic compound is 1.5 weight parts based on 100 weight parts of the cellulose acetate.

The dope was cast onto a drum cooled at 0° C. When the content of the solvent reached 70 wt. %, a film of the dope was peeled from the drum. Both sides of the film were fixed with pin-tenters, and the film was dried while the intervals of the tenters were adjusted so that the shrinkage of width might be not more than 10%. The film was further dried by transferring between rolls of a heating apparatus. Thus, a cellulose ester film of 107 μm thickness was prepared.

The Rth retardation value along the thickness direction was measured and found 80 nm. The discotic compound was not deposited not only after the film preparation but also after the post-treatments described below.

(Formation of First Undercoating Layer)

The prepared cellulose ester film was used as a transparent support.

On the support, the following coating solution was applied in the amount of 28 ml/m², and dried to form a first undercoating layer.

| Coating solution for first undercoating layer | |
| --- | --- |
| Gelatin | 5.42 weight parts |
| Formaldehyde | 1.36 weight part |
| Salicylic acid | 1.6 weight part |
| Acetone | 391 weight parts |
| Methanol | 158 weight parts |
| Water | 12 weight parts |

(Formation of Second Undercoating Layer)

On the first undercoating layer, the following coating solution was applied in the amount of 7 ml/m², and dried to form a second undercoating layer.

| Coating solution for second undercoating layer | |
| --- | --- |
| The following anionic polymer | 0.79 weight part |
| Citric half ethyl ester | 10.1 weight parts |
| Acetone | 200 weight parts |
| Methanol | 877 weight parts |
| Water | 40.5 weight parts |

(Anionic polymer)

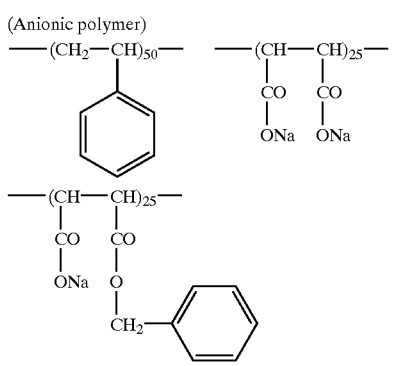

(Formation of Backing Layer)

On the back surface of the support, the following coating solution was applied in the amount of 25 ml/m², and dried to form a backing layer.

| Coating solution for backing layer | |
| --- | --- |
| Cellulose diacetate (average acetic acid content: 55%) | 6.56 weight parts |
| Silica matting agent (mean grain size: 1 μm) | 0.65 weight part |

| -continued | |
| --- | --- |
| Coating solution for backing layer | |
| Acetone | 679 weight parts |
| Methanol | 104 weight parts |

(Formation of Orientation Layer)

On the second undercoating layer, the aqueous solution of the denatured polyvinyl alcohol used in Example 8 was applied and dried with flowing air at 80° C. The formed film was subjected to rubbing treatment to form an orientation layer.

(Formation of Optically Anisotropic Layer)

In 8.43 g of methyl ethyl ketone, 1.8 g of the discotic liquid crystal compound used in Example 7, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by means of a wire bar of #2.5. The sheet was adhered to a metal frame, and heated in a thermostat at 130° C. for 2 minutes to align the discotic liquid crystal molecules. The sheet was irradiated with an ultraviolet ray at 130° C. for 1 minute by means of a high pressure mercury lamp of 120 W/cm, to polymerize the vinyl groups. Thus, the alignment was fixed. The sheet was cooled to room temperature to obtain an optical compensatory sheet. The optically anisotropic layer has the thickness of 1.0 μm.

(Preparation of Transparent Protective Film)

The procedure for preparing the transparent support was repeated except that the discotic compound (retardation increasing agent) was not used, to prepare a triacetyl cellulose film having 80 μm thickness. The film was used as a transparent protective film. On one surface of the film, first and second undercoating layers were provided in the same manner those for the transparent support.

(Preparation of Ellipsoidal Polarizing Plate)

On a stretched polyvinyl alcohol film, iodine was adsorbed to prepare a polarizing film. An optical compensatory sheet was attached with a polyvinyl alcoholic adhesive on one surface of the polarizing film, so that the optically anisotropic layer might be outside. On the reverse surface, the transparent protective film was attached with a polyvinyl alcoholic adhesive. The rubbing direction of the optically anisotropic layer was set to be parallel to the absorption axis of the polarizing film. Thus, an ellipsoidal polarizing plate was prepared.

(Preparation of Liquid Crystal Display)

On a glass plate having an ITO electrode, an orientation layer of polyimide was provided and subjected to a rubbing treatment. The procedure was repeated to prepare two glass substrates, and the substrates are arranged face-to-face through a spacer of 5 μm thickness so that the rubbing directions of the orientation layers might be perpendicular. Between the substrates, a rod-like liquid crystal compound having Δn of 0.0969 (ZL4792, Merck & Co., Inc.) was introduced to prepare a liquid crystal layer.

On both side of the thus-prepared liquid crystal cell of a TN mode, the ellipsoidal polarizing plates were attached so that the optically anisotropic layers might face the substrates. Thus, a liquid crystal display was prepared. In the display, the slow axis of the layered composition consisting of the optically anisotropic layer and the support was perpendicular to the rubbing direction of the liquid crystal cell.

Voltage was applied to the liquid crystal cell of the display, and an image was observed. Thereby, it was confirmed that the display gave a wide viewing angle.

Comparison Example 3

The procedure of Example 11 was repeated except that the discotic compound (retardation increasing agent) was not used, to prepare a cellulose ester film, an optical compensatory sheet, an ellipsoidal polarizing plate and a liquid crystal display.

Voltage was applied to the liquid crystal cell of the display, and an image was observed. Thereby, it was confirmed that the display gave a viewing angle narrower than that of Example 11.

We claim:

1. A cellulose ester film containing a discotic compound in an amount of 0.01 to 20 weight parts based on 100 weight parts of cellulose ester, wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

2. The cellulose ester film as defined in claim 1, wherein the discotic compound has a 1,3,5-triazine ring.

3. The cellulose ester film as defined in claim 2, wherein the discotic compound is a melamine compound.

4. The cellulose ester film as defined in claim 1, wherein the discotic compound has a porphyrin skeleton.

5. The cellulose ester film as defined in claim 1, wherein the film is optically negative uniaxial and the optic axis is essentially parallel to a normal line of the film plane.

6. The cellulose ester film as defined in claim 1, wherein the cellulose ester is cellulose acetate.

7. The cellulose ester film as defined in claim 1, wherein the film has a thickness in the range of 20 to 120 μm.

8. An optical compensatory sheet consisting of a cellulose ester film, wherein the film contains a discotic compound in an amount of 0.01 to 20 weight parts based on 100 weight parts of cellulose ester, and wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

9. An optical compensatory sheet comprising a cellulose ester film and an optically anisotropic layer comprising liquid crystal molecules, wherein the film contains a discotic compound in an amount of 0.01 to 20 weight parts based on 100 weight parts of cellulose ester, and wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

10. The optical compensatory sheet as defined in claim 9, wherein the liquid crystal molecules are discotic liquid crystal molecules.

11. An ellipsoidal polarizing plate comprising a transparent protective film, a polarizing film, a transparent support and an optically anisotropic layer comprising liquid crystal molecules in this order, wherein the transparent support is a cellulose ester film containing a discotic compound in an amount of 0.01 to 20 weight parts based on 100 weight parts of cellulose ester, and wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

12. A liquid crystal display comprising a liquid crystal cell and two polarizing elements arranged on both sides of the liquid crystal cell, wherein at least one of the polarizing elements is an ellipsoidal polarizing plate comprising a transparent protective film, a polarizing film, a transparent support and an optically anisotropic layer containing liquid crystal molecules in this order, wherein the transparent support is a cellulose ester film containing a discotic compound in an amount of 0.01 to 20 weight parts based on 100 weight parts of cellulose ester, and wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

13. The liquid crystal display as defined in claim 12, wherein the liquid crystal cell is a cell of a VA mode, an OCB mode or a TN mode.

14. A liquid crystal display comprising a reflection board, a liquid crystal cell and a polarizing element in this order, wherein the polarizing element is an ellipsoidal polarizing plate comprising a transparent protective film, a polarizing film, a transparent support and an optically anisotropic layer containing liquid crystal molecules in this order, wherein the transparent support is a cellulose ester film containing a discotic compound in an amount of 0.01 to 20 weight parts based on 100 weight parts of cellulose ester, and wherein the film has a $Rth^{550}$ retardation value defined by the following formula in the range of 60 to 1,000 nm:

$$Rth^{550}=[\{(nx+ny)/2\}-nz]\times d$$

in which each of nx and ny is the principal refractive index measured by light of 550 nm in plane of the film; nz is the principal refractive index measured by light of 550 nm along the thickness direction of the film; and d is the thickness of the film.

15. The liquid crystal display as defined in claim 14, wherein the liquid crystal cell is a cell of a HAN mode or a TN mode.

* * * * *